(12) United States Patent
Hart et al.

(10) Patent No.: US 11,577,317 B2
(45) Date of Patent: Feb. 14, 2023

(54) SPATIAL POROSITY AND COMPOSITION CONTROL IN ADDITIVE MANUFACTURING

(71) Applicant: Massachusetts Institute of Technology, Cambridge, MA (US)

(72) Inventors: Anastasios John Hart, Waban, MA (US); Ryan Wade Penny, Cambridge, MA (US); Martin C. Feldmann, Somerville, MA (US); Jonathan S. Gibbs, Severna Park, MD (US); Stuart P. Baker, Prescott, AZ (US)

(73) Assignee: Massachusetts Institute of Technology, Cambridge, MA (US)

( * ) Notice: Subject to any disclaimer, the term of this patent is extended or adjusted under 35 U.S.C. 154(b) by 551 days.

(21) Appl. No.: 16/513,702

(22) Filed: Jul. 16, 2019

(65) Prior Publication Data
US 2020/0016657 A1 Jan. 16, 2020

Related U.S. Application Data

(60) Provisional application No. 62/698,918, filed on Jul. 16, 2018.

(51) Int. Cl.
*B22F 10/20* (2021.01)
*B22F 10/30* (2021.01)

(52) U.S. Cl.
CPC .............. *B22F 10/20* (2021.01); *B22F 10/30* (2021.01); *B22F 2203/13* (2013.01);
(Continued)

(58) Field of Classification Search
CPC ...... B22F 10/20; B22F 10/30; B22F 2203/13; B22F 2301/052; B22F 2301/058; B22F 2301/35
See application file for complete search history.

(56) References Cited

U.S. PATENT DOCUMENTS 9,156,205 B2   10/2015  Mark et al.
9,669,583 B2 *  6/2017  Ferrar ................... B29C 64/20
(Continued)

OTHER PUBLICATIONS

Vilaro et al. ("As-fabricated and heat-treated microstructures of the Ti-6Al-4V alloy processed by selective laser melting." Metallurgical and materials transactions A 42.10 (2011): 3190-3199.) (Year: 2011).*

(Continued)

*Primary Examiner* — Anthony J Zimmer
*Assistant Examiner* — Ricardo D Morales
(74) *Attorney, Agent, or Firm* — Barnes & Thornburg LLP

(57) ABSTRACT

Disclosed are systems, devices, and methods for additive manufacturing that allow for control of composition and/or porosity of components being manufactured. More particularly, in exemplary embodiments, a secondary material can be used in conjunction with a primary feedstock material in a spatially controlled manner during an additive manufacturing process to control a composition of materials and/or porosity of a manufactured component. Systems, devices, and methods for additive manufacturing are also disclosed that allow for control of a pressure of an atmosphere surrounding a build surface during an additive manufacturing process. More particularly, a pressure of an atmosphere surrounding a build surface can be raised to a pressure greater than standard atmospheric pressure. Various features of the exemplary embodiments of the systems, devices, and methods disclosed can be used together to further control for composition and/or porosity and quality of a manufactured part.

21 Claims, 11 Drawing Sheets

(52) U.S. Cl.
CPC ... *B22F 2301/052* (2013.01); *B22F 2301/058* (2013.01); *B22F 2301/35* (2013.01)

(56) References Cited

U.S. PATENT DOCUMENTS

| | | | |
|---|---|---|---|
| 2004/0081573 A1* | 4/2004 | Newell | B22F 1/0003 419/10 |
| 2015/0321255 A1* | 11/2015 | Colin | C04B 35/64 419/55 |
| 2016/0311027 A1 | 10/2016 | Shimoyama | |
| 2016/0339521 A1 | 11/2016 | Dardas et al. | |
| 2016/0368054 A1 | 12/2016 | Ng et al. | |
| 2017/0341141 A1 | 11/2017 | Ackelid | |

OTHER PUBLICATIONS

Baker (Design and fabrication of an open-architecture selective laser melting system. Diss. Massachusetts Institute of Technology, 2017.). (Year: 2017).*

Liu, et al., "316L austenite stainless steels strengthened by means of nano-scale twins," Journal of Materials Science Technology, vol. 26, Issue 4, pp. 289-292, Apr. 2010.

Lu, et al., "Strengthening austenitic steels by using nanotwined austenitic grains," Scripta Materialia, vol. 66, Issue 11, pp. 878-883, Jun. 2012.

Luo, A, "Chapter 8—Applications: aerospace, automotive and other structural applications of magnesium," Fundamentals of Magnesium Alloy Metallurgy, M.O. Pekguleryuz, K.U. Kainer, and A.A. Kaya, Eds., Woodhead Publishing, pp. 266-316, 2013.

Matthews, et al., "Denudation of metal powder layers in laser powder bed fusion processes," Acta Materialia, vol. 114, pp. 33-42, Aug. 2016.

Matthews, et al., "Direct measurements of laser absorptivity during melt pool formation associated with powder bed fusion additive manufacturing processes," Journal of Laser Applications, vol. 30, p. 032302, 2018.

Mendis, et al., "Chapter 4—Understanding precipitation processes in magnesium alloys," Fundamentals of Magnesium Alloy Metallurgy, M.O. Pekguleryuz, K.U. Kainer and A.A. Kaya, Eds., Woodhead Publishing, pp. 125-151, 2013.

Montgomery, et al., "Process mapping of inconel 625 in laser powder bed additive manufacturing," Solid Freeform Fabrication Symposium, pp. 1195-1204, 2015.

Moriarty, et al., "First-principles temperature-pressure phase diagram of magnesium," Physical Review B, vol. 51, pp. 5609-5616, Mar. 1995.

Mower, et al., "Mechanical behavior of additive manufactured, powder-bed laser-fused materials," Materials Science and Engineering: A, vol. 651, pp. 198-213, Jan. 2016.

Mukai, et al., "Measurement of the densities of nickel-based ternary, quaternary and commercial alloys," Materials Transactions, vol. 45, Issue 10, pp. 2987-2993, 2004.

Murr, et al., "Next-generation biomedical implants using additive manufacturing of complex, cellular and functional mesh arrays," Philosophical Transactions of the Royal Society of London A: Mathematical, Physical and Engineering Sciences, vol. 368, No. 1917, pp. 1999-2032, 2010.

Nakanishi, et al., "Effect of partial solution nitriding on mechanical properties and corrosion resistance in a type 316L austenitic stainless steel plate," Materials Science and Engineering: A, vol. 460-461, pp. 186-194, Jul. 2007.

Neelameggham, R, "Chapter 1—Primary Production of Magnesium," Fundamentals of Magnesium Alloy Metallurgy, M.O. Pekguleryuz, K.U. Kainer and A.A. Kaya, Eds., Woodhead Publishing, pp. 1-32, 2013.

Ning, et al., "An approach to minimize build errors in direct metal laser sintering," IEEE Transactions on Automation Science and Engineering, vol. 3, Issue 1, pp. 73-80, Jan. 2006.

Oxman, et al., "Functionally Graded Rapid Prototyping," Proceedings of VRAP: Advanced Research in Virtual and Rapid Prototyping, 2011.

Pang, et al., "3D Transient Multiphase Model for Keyhole, Vapor Flume, and Weld Pool Dynamics in Laser Welding ncluding the ambient pressure effect," Optics and Lasers in Engineering, vol. 74, pp. 47-58, Nov. 2015.

Pekguleryuz, M, "Chapter 5—Alloying behavior of magnesium and alloy design," Fundamentals of Magnesium Alloy Metallurgy, M.O. Pekguleryuz, K.U. Kainer and A.A. Kaya, Eds., Woodhead Publishing, pp. 152-196, 2013.

Qiu, et al., "Microstructure and tensile properties of selectively laser-melted and of HIPed laser-melted Ti—6Al—4V," Materials Science and Engineering: A, vol. 578, pp. 230-239, Aug. 2013.

Rashid, et al., "Effect of scan strategy on density and metallurgical properties of 17-4PH parts printed by Selective Laser Melting (SLM)," Journal of Materials Processing Technology, vol. 249, pp. 502-511, Nov. 2017.

Rawers, et al., "Tensile characteristics of nitrogen enhanced powder injection moulded 316L stainless steel," Powder Metallurgy, vol. 39, Issue 2, pp. 125-129, 1996.

Saunders et al., "X marks the spot—find ideal process parameters for your metal am parts," Sep. 2017, https://www.linkedin.com/pulse/x-marks-spot-find-ideal-process-parameters-your-metal-marc-saunders/.

Scipioni Bertoli, et al., "On the limitations of Volumetric Energy Density as a design parameter for Selective Laser Melting," Materials & Design, vol. 113, pp. 331-340, Jan. 2017.

Shang, et al., "Chapter 3—Thermodynamic properties of magnesium alloys," Fundamentals of Magnesium Alloy Metallurgy, M.O. Pekguleryuz, K.U. Kainer and A.A. Kaya, Eds., Woodhead Publishing, pp. 85-124, 2013.

Shen, et al., "Development of porous 316L stainless steel with controllable microcellular features using selective laser melting," Materials Science and Technology, vol. 24, Issue 12, pp. 1501-1505, 2008.

Simchi, et al., "Direct laser sintering of metal powders: Mechanism, kinetics and microstructural features," Materials Science and Engineering: A, vol. 428, Issues 1-2, pp. 148-158, Jul. 2006.

Stinton, et al., "Equation of state and high-pressure/high-temperature phase diagram of magnesium," Physical Review B, vol. 90, Issue 13, p. 134105, 2014.

Thomas, et al., "Normalised model-based processing diagrams for additive layer manufacture of engineering alloys," Acta Materialia, vol. 108, pp. 26-35, Apr. 2016.

Ueno, et al., "Enhanced fatigue properties of nanostructured austenitic sus 3161 stainless steel," Acta Materialia, vol. 59, Issue 18, pp. 7060-7069, Oct. 2011.

Vrancken, et al., "Heat treatment of Ti-6Al-4V produced by selective laser melting: microstructure and mechanical properties," Journal of Alloys and Compounds, vol. 541, pp. 177-185, Nov. 2012.

Wang, et al., "Additively manufactured hierarchical stainless steels with high strength and ductility," Nature Materials, vol. 17, pp. 63-71, 2018.

Wang, et al., "Mechanisms and characteristics of spatter generation in SLM processing and its effect on the properties," Materials and Design, vol. 117, pp. 121-130, Mar. 2017.

Wang, et al., "Study on energy input and its influences on single-track, multi-track, and multi-layer in SLM," International Journal of Advanced Manufacturing Technology, vol. 58, No. 9-12, pp. 1189-1199, Feb. 2012.

Wei, et al., "Thermal conductivity of metal powders for powder bed additive manufacturing," Additive Manufacturing, vol. 21, pp. 201-208, May 2018.

Weinberg, J.C., "A precision blade mechanism for powder recoating in selective laser melting," Master's Thesis, Massachusetts Institute of Technology, Department of Mechanical Engineering, Jun. 2018.

Witte, F, "Chapter 10—Applications: use of magnesium in medical applications," Fundamentals of Magnesium Alloy Metallurgy, M.O. Pekguleryuz, K.U. Kainer and A.A. Kaya, Eds., Woodhead Publishing, pp. 342-355, 2013.

Witte, F, "The history of biodegradable magnesium implants: A review," Acta Biomaterialia, vol. 6, No. 5, pp. 1680-1692, 2010.

(56) References Cited

OTHER PUBLICATIONS

Xu, et al., "Additive manufacturing of strong and ductile Ti-6A1-4V by selective laser metling via in situ martensite decomposition," Acta Materialia, vol. 85, pp. 74-84, Feb. 2015.

Xu, et al., "In situ tailoring microstructure in additively manufactured Ti-6A1-4V for superior mechanical performance," Acta Materialia, vol. 125, pp. 390-400, Feb. 2017.

Yan, et al., "Strength and ductility of 316l austenitic stainless steel strengthened by nano-scale twin bundles," Acta Materialia, vol. 60, pp. 1059-1071, Feb. 2012.

Yang, et al., "Effect of decomposition properties of titanium hydride on the foaming process and pore structures of Al alloy melt foam," Materials Science and Engineering: A, vol. 445-446, pp. 415-426, Feb. 2007.

Zhang, et al., "Laser additive manufacturing foam aluminum-12. wt-% silicon with different addition TiH2 foaming agent," Materials Science and Technology (United Kingdom), vol. 0836, pp. 1-14, 2017.

Zhao, et al., "Thermodynamic calculation on the formation of titanium hydride," Chinese Journal of Chemical Physics, vol. 21, No. 6, 2008.

Zielinski, et al., "Tem studies of dislocation substructure in 316 austenitic stainless steel strained after annealing in various environments," Materials Science and Engineering: A, vol. 249, Issues 1-2, pp. 91-96, Jun. 1998.

Ziolkowski, et al., "Application of X-ray CT method for discontinuity and porosity detection in 316L stainless steel parts produced with SLM technology," Archives of Civil and Mechanical Engineering, vol. 14, Issue 4, pp. 608-614, Aug. 2014.

[No Author Listed] "Primer on Spontaneous Heating and Pyrophoricity," 1994.

[No. Author Listed] SPI Lasers UK Ltd., Southhampton, G4 Pulsed Fibre Laser V8 Interface Manual, Rev. A, 2013.

Al-Bermani, et al., "The origin of microstructural diversity, texture, and mechanical properties in electron beam melted Ti-6A1-4V," Metallurgical and Materials Transactions A: Physical Metallurgy and Materials Science, vol. 41, No. 13, pp. 3422-3434, 2010.

Albertini, et al., "Advances in the hopkinson bar testing of irradiated/non-irradiated nuclear materials and large specimens," Philosophical Transactions of the Royal Society A, vol. 372, p. 20130197, 2014.

Ali, et al., "Effect of scanning strategies on residual stress and mechanical properties of Selective Laser Melted Ti-6A1-4V," Materials Science and Engineering: A, vol. 712, pp. 175-187, Jan. 2018.

Andani, et al., "A Study on the Effect of Energy Input on Spatter Particles Creation during Selective Laser Melting Process," Additive Manufacturing, vol. 20, pp. 33-43, Mar. 2018.

Ardila, et al., "Effect of IN718 recycled powder reuse on properties of parts manufactured by means of Selective Laser Melting," Physics Procedia, vol. 56, pp. 99-107, 2014.

Arisoy, et al., "Influence of scan strategy and process parameters on microstructure and its optimization in additively manufactured nickel alloy 625 via laser powder bed fusion," International Journal of Advanced Manufacturing Technology, vol. 90, Issue 5-8, pp. 1393-1417, May 2017.

Atkinson, et al., "Fundamental aspects of hot isostatic pressing: An overview," Metallurgical and Materials Transactions A, vol. 31, Issue 12, pp. 2981-3000, Dec. 2000.

Avala, et al., "Measurement of thermo physical properties of nickel based superalloys," International Journal on Mechanical Engineering and Robotics, vol. 1, No. 1, pp. 108-112, 2013.

Baker, S, "Design and fabrication of an open-architecture selective laser melting system," Master's Thesis, Massachusetts Insitute of Technology, Department of Electrical Engineering and Computer Science, Feb. 2017.

Barnett, M, "Chapter 6—Forming of magnesium and its alloys," Fundamentals of Magnesium Alloy Metallurgy, M.O. Pekguleryuz, K.U. Kainer and A.A. Kaya, Eds., Woodhead Publishing, pp. 197-231, 2013.

Bender et al., "Chapter 7—Corrosion and surface finishing of magnesium and its alloys," Fundamentals of Magnesium Alloy Metallurgy, M.O. Pekguleryuz, K.U. Kainer and A.A. Kaya, Eds., Woodhead Publishing, pp. 232-265, 2013.

Bidare, et al., "An open-architecture metal powder bed fusion system for in-situ process measurements," Additive Manufacturing, vol. 16, pp. 177-185, Aug. 2017.

Bidare, et al., "Fluid and particle dynamics in laser powder bed fusion," Acta Materialia, vol. 142, pp. 107-120, Jan. 2018.

Boswell, J, "Development of aero engine component manufacturing using laser additive manufacturing," Doc. No. DR75: Merlin Final Report, Rolls-Royce, MERLIN Consortium, 2014, http://cordis.europa.eu/docs/results/266/266271/final1-dr75-merlin-final-report.pdf.

Brif, et al., "The use of high-entropy alloys in additive manufacturing," Scripta Materialia, vol. 99, pp. 93-96, Apr. 2015.

Carter, et al., "The influence of the laser scan strategy on grain structure and cracking behaviour in SLM powder-bed fabricated nickel superalloy," Journal of Alloys and Compounds, vol. 615, pp. 338-347, Dec. 2014.

Carter, et al., "Laser powder bed fabrication of nickel-based superalloys: Influence of parameters; characterisation, quantification and mitigation of cracking," Superalloys 2012: 12th International Symposium on Superalloys, pp. 577-586.

Chen, et al., "Tensile properties of a nanocrystalline 316l austenitic stainless steel," Scripta Materilia, vol. 52, Issue 10, pp. 1039-1044, 2005.

Cooper et al., "Additive layer manufacture of Inconel 625 metal matrix composites, reinforcement material evaluation," Journal of Materials Processing Technology, vol. 213, Issue 12, pp. 2191-2200, Dec. 2013.

Cunningham, et al., "Synchrotron-based x-ray microtomography characterization of the effect of processing variables on porosity formation in laser powder-bed additive manufacturing of ti-6al-4v," JOM, vol. 69, Issue 3, pp. 479-484, Mar. 2017.

Davis, J.R., Metals Handbook, Desk Edition, p. 64, ASM International, 2nd Edition, 1998.

Demir, et al., "From pulsed to continuous wave emission in SLM with contemporary fiber laser sources: effect of temporal and spatial pulse overlap in part quality," International Journal of Advanced Manufacturing Technology, vol. 91, Issue 5-8, pp. 2701-2714, Jul. 2017.

Dieringa, H, "Chapter 9—Applications: magnesium-based metal matrix composites (MMCs)," Fundamentals of Magnesium Alloy Metallurgy, M.O. Pekguleryuz, K.U. Kainer and A.A. Kaya, Eds., Woodhead Publishing, pp. 317-341, 2013.

Ding, et al., "Comparison study of numerical analysis for heat transfer and fluid flow under two different laser scan pattern during selective laser melting," Optik, vol. 127, Issue 22, pp. 10898-10907, Nov. 2016.

Errandonea, et al., "Study of the phase transformations and equation of state of magnesium by synchrotron x-ray diffraction," Journal of Physics: Condensed Matter, vol. 15, No. 8, p. 1277, 2003.

Ferrar, et al., "Gas flow effects on selective laser melting (SLM) manufacturing performance," Journal of Materials Processing Technology, vol. 212, No. 2, pp. 355-364, Feb. 2012.

Fu et al., "Three-dimensional temperature gradient mechanism in selective laser melting of Ti-6A1-4V," Journal of Manufacturing Science and Engineering, vol. 136, Issue 6, p. 061004, Dec. 2014.

Gharbi, et al., "Influence of a pulsed laser regime on surface finish induced by the direct metal deposition process on a Ti64 alloy," Journal of Materials Processing Technology, vol. 214, Issue 2, pp. 485-495, Feb. 2014.

Gibbs, J, "Testbeds for Quality and Porosity Control in Metal Additive Manufacturing by Selective Laser Melting," Massachusetts Insitute of Technology, 2018.

Gilbreath, W.P., "The Vapor Pressure of Magnesium Between 223° and 385° C," National Aeronautics and Space Administration, Washington, D.C., Mar. 1965.

Glicksman, M.E., "Principles of solidifcation: an introduction to modern casting and crystal growth concepts," Springer Science & Business Media, 2010.

(56) References Cited

OTHER PUBLICATIONS

Gong, et al., "Analysis of defect generation in Ti-6Al-4V parts made using powder bed fusion additive manufacturing processes," Additive Manufacturing, vols. 1-4, pp. 87-98, Oct. 2014.

Gusarov, et al., "Model of Radiation and Heat Transfer in Laser-Powder Interaction Zone at Selective Laser Melting," Journal of Heat Transfer, vol. 131, Issue 7, 2009.

Heigel, et al., "Measurement of the melt pool length during single scan tracks in a commercial laser powder bed fusion process," Journal of Manufacturing Science and Engineering, vol. 140, Issue 5, p. 051012, May 2018.

Hofmann, et al., "Developing Gradient Metal Alloys through Radial Deposition Additive Manufacturing," Scientific Reports, vol. 4, Article No. 5357, 2014.

International Search Report and Written Opinion for Application No. PCT/US19/42097, dated Nov. 14, 2019 (19 pages).

Ion, et al., "Diagrams for laser materials processing," Acta Matellurgica et Materialia, vol. 40, No. 7, pp. 1539-1551, 1992.

Jauer, et al., "Selective Laser Melting of Magnesium Alloys," European Cells and Materials, vol. 30, 2015.

Juechter, et al., "Processing window and evaporation phenomena for Ti-6Al-4V produced by selective electron beam melting," Acta Materialia, vol. 76, pp. 252-258, Sep. 2014.

Kaya, A, "Chapter 2—Physical metallurgy of magnesium," Fundamentals of Magnesium Alloy Metallurgy, M.O. Pekguleryuz, K.U. Kainer and A.A. Kaya, Eds., Woodhead Publishing, pp. 33-84, 2013.

Kamath, et al., "Density of additively-manufactured, 316L SS parts using powder-bed fusion at powers up to 400 W," International Journal of Advanced Manufacturing Technology, vol. 74, Issue 1-4, pp. 65-78, Sep. 2014.

Kasperovich, et al., "Improvement of fatigue resistance and ductility of TiAl6V4 processed by selective laser melting," Journal of Materials Processing Technology, vol. 220, pp. 202-214, Jun. 2015.

Khairallah, et al., "Laser powder-bed fusion additive manfacturing: Physics of complex melt flow and formation mechanisms of pores, spatter, and denudation zones," Acta Materialia, vol. 108, pp. 36-45, Apr. 2016.

Kim, C.S., "Thermophysical properties of stainless steels," Pub ANL-75-55, Argonne National Laboratory, Argonne, Illinois, Sep. 1975.

Kovalev, et al., "Thermal decomposition of TiH2: A TRXRD study," International Journal of Self-Propagating High-Temperature Synthesis, vol. 19, Issue 4, pp. 253-257, Dec. 2010.

Kudzal, et al., "Effect of scan pattern on the microstucture and mechanical properties of Powder Bed Fusion additive manufactured 17-4 stainles steel," Materials & Design, vol. 133, pp. 205-215, Nov. 2017.

Kumar, et al., "Formation of ultrafine grained microstructure in the austenitic stainless steel and its impact on tensile properties," Materials Science Engineering A, vol. 528, Issue 6, pp. 2209-2216, Mar. 2011.

Ladewig, et al., "Influence of the shielding gas flow on the removal of process by-products in the selective laser melting process," Additive Manufacturing, vol. 10, pp. 1-9, Apr. 2016.

\* cited by examiner

SPATIAL POROSITY AND COMPOSITION CONTROL IN ADDITIVE MANUFACTURING

CROSS REFERENCE TO RELATED APPLICATION

The present application claims priority to and the benefit of U.S. Provisional Application No. 62/698,918, filed Jul. 16, 2018, and titled "Spatial Porosity and Composition Control in Additive Manufacturing," the contents of which is incorporated herein by reference in its entirety.

FIELD

The present disclosure relates to systems, devices, and methods for additive manufacturing, and more particularly relates to the use of atmospheric control and/or spatial control during the manufacturing process to enhance the quality and efficiency of the additive manufacturing process, as well as enable the ability to locally control porosity and/or composition of a manufactured part.

BACKGROUND

Additive Manufacturing (AM) has become a central technology for rapid prototyping and short run manufacturing. Selective laser melting (SLM) is perhaps the most ubiquitous method for metal AM. From early machines to the most sophisticated machines available today, there are four components used in SLM/Selective Laser Sintering: a build stage, powdered build material, a recoating system, and a steerable laser power source. A simplified model of an SLM machine 10 can be seen in FIG. 1. The SLM machine 10 includes a vertical motion stage 12 that positions a build platform 14, on top of which a three-dimensional part 16 is constructed. A recoater 18 is coupled to the build platform 14 and a powder well (not shown). The recoater 18 is used to distribute a thin, even coating of a powdered build material drawn from the powder well over the build platform 14 creating a build layer. A steerable laser source 20 is used to selectively melt the build material in each successive build layer to create a desired three-dimensional part.

The process of building a part using the SLM machine 10 begins with the recoater 18 spreading a thin, typically 50 μm to 100 μm, layer of the powdered build material across the build platform 14. The steerable laser system 20 then melts select parts of the newly coated layer of powdered build material by directing the laser energy at the desired location(s) and forming a melt pool of the molten build material. As the laser energy is removed from the desired location(s) the molten material solidifies. Once the selective melting is complete, the build platform 14 is lowered an amount equal to a layer height of the system by the vertical stage 12, and the recoater 18 deposits a new layer of build material. This layer-wise process repeats until the entire part has been built.

To build at a certain rate and/or achieve a melt pool of a specific diameter and depth traveling at a desired speed, there has to be a requisite energy input into the system to melt the build material and form it into a solid feature integrated into the layer below it. This can happen through the formation of a melt pool at the laser-build material interface, and the transfer of energy from the laser into the melt pool, and then into the surrounding material. Due to thermal resistance, a temperature gradient can form over the melt pool. The build material can be right at its melting point at the edge of the melt pool, and the temperature can increase towards the laser contact region. The faster a part is constructed, the greater the energy transfer across that resistance, which gives rise to a higher temperature gradient. The dynamics of the melt pool and stability of the melt track upon cooling can be critical to the microstructure, porosity, and final properties of the solidified material.

If material in the laser contact region becomes too hot, exceeding the boiling temperature of the build material, or of certain alloying elements within the build material, the material can begin to vaporize, forming jets of gas, high-velocity convection currents, and vapor condensate plumes. This can push and distort the melt-pool and interfere with the laser absorption at the build layer, leading to poor performance.

The dynamics of the AM process constrain the use of powder-bed AM devices and methods, such as the SLM printer described above with respect to FIG. 1, to a small catalogue of materials when compared to traditional manufacturing processes. The use of high temperature energy sources and reliance on melting of a material during the AM process can dictate material selection. Generally, powder-bed AM printing materials are limited to derivatives of titanium, stainless steel, nickel, and cobalt. For example, magnesium, the third most popular structural metal, is commonly used in traditional manufacturing processes, but is not typically suitable for AM printing due, at least in part, to the thermal properties of magnesium.

Moreover, AM components can generally be manufactured only as high-density parts. The minimum feature size of an AM fabricated part can be limited by powder material and size distribution characteristics, as well as the diameter of a laser spot on the powder bed. Accordingly, to achieve variation in component properties, particularly on fine length scales, a part usually must be specifically designed with the appropriate geometry (e.g., a lattice structure design). This is a labor-intensive process and results in slow manufacture times. For example, hollow architectures must all be open-cell due to requirements of removing extra powder or support material. Moreover, to attain low density, lightweight parts (and those with tune-able properties, such as stiffness), print jobs are currently designed with open-cell lattice structures with length scales based on these feature size limits.

Accordingly, there is a need for systems, devices, and methods of manufacturing a three-dimensional component with AM that allow for wider material selection, improved part performance, and control of component characteristics.

SUMMARY

The systems, devices, and methods described herein generally relate to an AM printer and methods of manufacturing components using an AM process that enable spatial grading of a composition and/or porosity of an AM component. In some embodiments, a pressure of an environment surrounding a build surface can be controlled such that a pressure greater than standard atmospheric pressure is used during the printing process. In some embodiments, control of void generation can include depositing a secondary material onto a build surface and/or mixing a secondary material with a primary feedstock material and activating the secondary material to cause the secondary material to release a gaseous product. The primary feedstock material can be configured such that when the primary material is melted to form a melt pool, at least a portion of the released gaseous product can be trapped within the melt pool. Upon cooling and solidification of the melt pool, the trapped gaseous product can create voids within the solidified material component. A spatial control element that can be configured to move relative to a build surface can deposit the secondary material such that the deposition of the secondary material can be adjusted and controlled, thereby providing for the control of void generation and/or composition of a solidified material component.

One exemplary embodiment of a system for manufacturing a three-dimensional object includes a deposition element for depositing a primary feedstock material, a spatial control element for depositing a secondary material onto at least a portion of a primary feedstock material deposited by the deposition element or a build surface, and an energy source. The energy source is configured to at least one of locally heat a secondary material that is deposited onto at least a portion of a primary feedstock material or a build surface, the primary feedstock material having been deposited by the deposition element and the energy source being a spatially-controlled energy source, and upon heating of the secondary material the secondary material at least one of dissolves, melts, or releases a gaseous product, or locally heat a primary feedstock material to become molten while at least a portion of the secondary material remains solid to form a composite of at least two solid phases upon solidification, with the secondary material having been deposited by the spatial control element and the primary feedstock material having been deposited by the deposition element. The deposition element and the spatial control element are configured to deposit their respective materials over multiple layers to form a three-dimensional object that has at least one of a spatially-graded composition or a spatially-graded porosity. For example, each layer can be capable of having different composition and/or porosities that are spatially-controlled.

In some embodiments, the spatial control element and the deposition element can be configured to allow for a characteristic size of the secondary material to be substantially smaller than a characteristic size of the primary material. In some embodiments the spatially controlled energy source can be configured to heat the secondary material to cause the secondary material to release a gas from it. Further, the deposition element can be configured to deposit a primary feedstock material that is configured to trap the gas within a molten phase of the primary feedstock material, and is further configured to solidify thereafter to form a porous material. The system can include a melt pool in fluid communication with the deposition element such that the primary feedstock material forms the melt pool upon being locally heated by the energy source.

At least one of the deposition element or the spatial control element can be configured to control at least one of an amount of the primary feedstock deposited by the deposition element or an amount of the secondary material deposited by the spatial control element relative to one another so as to vary a grain size of a layer of the multiple layers of the three-dimensional object. Alternatively, a controller or the equivalent can provide this controlling capability in lieu of one or both of the deposition element or the spatial control element. In some embodiments, the deposition element can be configured to spread the primary feedstock material and the spatial control element can be configured to deposit the secondary material by inkjet printing and/or extrusion.

The system can further include a controller configured to vary at least one of a relative material composition or a process gas pressure to change a porosity of a manufactured object across one or more layers of the multiple layers. In some embodiments, the deposition element can be configured to deposit a primary feedstock material that comprises an alloy that includes at least one of magnesium, aluminum, iron, or titanium. In some other embodiments, the deposition element can be configured to deposit a primary feedstock material that includes magnesium. The spatial control element can be configured to deposit a secondary material that includes a solid particle material having a characteristic particle size approximately in the range of about 1 nm to about 100 nm. Alternatively, or additionally, the spatial control element can be configured to deposit a secondary material that comprises a metallic hydride (e.g., titanium hydride, which is one non-limiting example).

Another exemplary embodiment of a system for manufacturing a three-dimensional object includes a powder bed, a vertical stage, a recoater, and an atmospheric control system that is configured to at least one of regulate a pressure of an environment surrounding the vertical stage to keep pressure at a level greater than standard atmospheric pressure or control atmospheric content of the environment surrounding the vertical stage such that a primary feedstock material that does not have a liquid phase at atmospheric pressure melts and forms a liquid when heated above a specific temperature.

The system can further include a pressure vessel that is coupled to a pressure manager of the atmospheric control system, with at least the powder bed, the vertical stage, and the recoater being disposed within the pressure vessel. Alternatively, or additionally, the system can include one or more deposition elements that are configured to provide a build material. In some such embodiments, the system can further include a melt pool that is in fluid communication with the one or more deposition elements such that the build material forms the melt pool upon being locally heated by the energy source. The deposition element(s) can be configured to provide a build material that comprises an alloy that includes at least one of magnesium, aluminum, iron, or titanium. In some other embodiments, the deposition element(s) can be configured to provide a build material that includes magnesium.

In some embodiments, the system can be configured to operate in a closed-system configuration such that after the system is brought to a threshold pressure, gas is added or released to maintain the threshold pressure. In other embodiments, the system can be configured to operate in an open-system configuration such that the system is configured to recirculate a containment gas through the system to allow for at least one of continuous gas monitoring, content control, or flow control. In some such embodiments, the system can be configured to permit a flow of evaporated metal condensate away from a laser beam associated therewith to ensure an incident laser energy reaches the powder bed.

The atmospheric control system can be configured to vary the pressure of the environment surrounding the vertical stage over a time of a build process. For example, the pressure can be varied from a pressure that is greater than standard atmospheric pressure to cause dissolution or a gas within a molten build material to a pressure that is lower than standard atmospheric pressure to generate pores within the build material.

An exemplary method of additive manufacturing includes introducing a layer of powdered build material to a build surface in a build chamber of an additive manufacturing device, controlling a pressure of a build environment above atmospheric pressure within the build chamber, and scanning an energy source over at least a portion of the layer of powdered build material such that at least a portion of the powdered build material is fused at least partially while controlling the pressure of an environment in the build chamber so as to suppress evaporation of the powdered material during fusing.

The method can further include introducing one or more additional layers of powder material to at least one of the build surface, the layer of powdered build material, or the one or more additional layers of powdered build material. Further, the method can include scanning one of the energy source or one or more additional energy sources over the one or more additional layers of powder material such that the material is fused at least partially while controlling the pressure of the environment in the build chamber so as to suppress evaporation of the powder material during fusing, thereby producing a multi-layer three-dimensional object.

In some embodiments the powder material can be granular and/or can include an alloy that includes at least one of magnesium, aluminum, iron, or titanium and/or can include magnesium.

Controlling the pressure of the surrounding environment can further include maintaining the pressure of the surrounding environment at a pressure that is greater than standard atmospheric pressure. In some embodiments, controlling the pressure of the surrounding environment can include controlling the pressure of the surrounding environment in a closed-system configuration to maintain a desired pressure profile. Alternatively, or additionally, controlling the pressure of the surrounding environment can include recirculating a containment gas through the build chamber.

In some embodiments, the method can further include introducing a gas at a pressure higher than atmospheric pressure to the build environment. In some such embodiments, at least one of scanning an energy source or scanning one of the energy source or one or more additional energy sources can include scanning the respective energy source or energy sources over the powdered build material while controlling the pressure of the build environment such that at least a portion of the powdered build material becomes molten and at least a portion of the gas to diffuse into the molten build material. Further, the method can include removing the energy source and/or the one or more additional energy sources from the molten build material such that the build material solidifies, trapping the diffused molecules of the gas in the solidified build material. In some embodiments, the method can further include performing a secondary processing step at a pressure lower than the pressure at which the gas was introduced to allow the trapped molecules of the gas to evolve out of the build material, resulting in void generation in the build material. In some such embodiments, the secondary processing step can further include reheating the build material under the pressure lower than the pressure at which the gas was introduced to a temperature that allows the trapped gas to expand and allowing the build material to completely re-solidify such that a final three-dimensional component is formed from the build material having a porous structure. In at least some instances, references to a gas herein can alternatively be referred to as a shielding agent, as described in greater detail below.

An exemplary method of additive manufacturing a composite material includes introducing a layer of a powdered feedstock material to a build surface, depositing a secondary material onto at least a portion of the layer of the powdered feedstock material or the build surface, and scanning one or more energy sources over at least a portion of the layer of the powdered feedstock material such that the powdered feedstock material melts to form a melt pool. The secondary material releases a gaseous product at a temperature at or below a melting temperature of the feedstock material.

The method can further include introducing one or more additional layers of a powder material to at least one of the build surface, the layer of the feedstock material on the build surface, the secondary material, or the one or more additional layers of a powder material. The powder material of the one or more additional layers of a powder material can be one or more of the feedstock material or one or more additional powder materials. The method can further include depositing an additional material onto the one or more additional layers of a powder material, with the additional material being one or more of the secondary material or one or more additional materials. Still further, the method can include scanning one of the one or more energy sources or one or more additional energy sources over the one or more additional layers of a powder material such that the one or more additional layers of a powder material melt to form at least one of the melt pool or one or more additional melt pools to produce a multi-layer three-dimensional object.

Depositing the secondary material onto the layer of the feedstock material can include operating an inkjet printhead over the layer of the feedstock material to deposit the secondary material onto the layer of the feedstock material.

In some embodiments, the one or more energy sources can include at least one laser energy source. The method can further include moving the one or more energy sources away from the melt pool such that the melt pool solidifies and traps the released gaseous product from the secondary material in the solidified melt pool, thereby creating pores in the primary material. At least a portion of the secondary material can melt. In some embodiments, the melt pool can contact the secondary material to cause the release of the gaseous product from the secondary material.

The method can further include controlling a relative amount of the powdered feedstock material and the secondary material so as to vary a grain size of a solidified material that results after scanning the one or more energy sources. The at least a portion of the secondary material can melt. Introducing a layer of a powdered feedstock material to a build surface can include spreading the powdered feedstock material across the build surface. Further, in some embodiments, depositing a secondary material onto the layer of the powdered feedstock material can include inkjet printing the secondary material and/or extruding the secondary material onto the layer of the powdered feedstock material.

An exemplary method of additive manufacturing a component includes introducing a layer of powdered feedstock material to a build surface, depositing a secondary material onto the layer of the powdered feedstock material, and scanning one or more energy sources over the layer of the powdered feedstock material such that at least a portion of the powdered feedstock material melts. The secondary material includes at least one of carbon nanotubes, metal nanoparticles, or ceramic nanoparticles, and remains solid upon melting of the feedstock material.

In some embodiments, the method can further include introducing one or more additional layers of a powder material to at least one of the build surface, the layer of the feedstock material on the build surface, the secondary material, or the one or more additional layers of a powder material, the powder material of the one or more additional layers of a powder material being one or more of the feedstock material or one or more additional powder materials. The method can further include depositing an additional material onto the one or more additional layers of a powder material, the additional material being one or more of the secondary material or one or more additional materials. Still further, the method can include scanning one of the one or more energy sources or one or more additional energy sources over the one or more additional layers of a powder material such that the one or more additional layers of a powder material melt to form at least one of the melt pool or one or more additional melt pools to produce a multi-layer three-dimensional object. In some embodiments, the one or more energy sources can include at least one spatially controlled energy source.

Depositing the secondary material onto the layer of the powdered feedstock material can include operating an inkjet printhead over the layer of the powdered feedstock material to deposit the secondary material onto the layer of the powdered feedstock material. In some embodiments, the powdered feedstock material can be granular.

An exemplary embodiment for locally controlling a density of a material within an additive manufacturing process includes mixing a build material with one or more compounds that releases gas when heated to an elevated temperature, introducing a layer of the mixed build material to a build surface, scanning an energy source over at least a portion of the layer of the mixed build material, and removing the energy source. Scanning the energy source over at least a portion of the layer of the mixed build material results in the mixed build material at least partially melting to form a molten build material, and further causes the one or more compounds to release gas within the molten build material. This is done while controlling a pressure of an environment surrounding the build surface. Removing the energy source results in the molten material solidifying such that the released gas is trapped in the solidified molten material.

In some embodiments, the method can further include introducing one or more additional layers of a powder material to at least one of the build surface, the layer of the mixed build material, or the one or more additional layers of a powder material. The powder material of the one or more additional layers of a powder material can be one or more of the mixed build material and one or more additional powder materials. The method can further include scanning at least one of the one or more energy sources or one or more additional energy sources over the one or more additional layers of a powder material to produce a multi-layer three-dimensional object. Scanning the at least one of the one or more energy sources or one or more additional energy sources over the one or more additional layers of a powder material can cause at least one of at least a portion of the one or more additional layers of a powder material to melt to form at least one of the melt pool or one or more additional melt pools, or at least a portion of the one or more additional layers of a powder material to release a gaseous product.

Controlling the pressure of an environment surrounding the build surface can include regulating the pressure to a pressure greater than standard atmospheric pressure. In some embodiments, the method can further include controlling the build pressure to a first pressure level that is greater than standard atmospheric pressure during introducing the layer of the mixed build material to the build surface and/or scanning the energy source over the layer of the mixed build material. The method can further include removing the energy source such that the molten build material solidifies and recessing the build surface. Still further, the method can include introducing a second layer of a mixed build material to at least one of the build surface or the layer of the mixed build material, and scanning at least one of the energy source or an additional energy source over the second layer of the mixed build material while controlling the build pressure to a second pressure level that is different from the first pressure level. The layer of the mixed build material and the second layer can have different layer porosities.

In some embodiments, the build material can include magnesium. In some embodiments, locally controlling the release of gas from the one or more compounds can include spatially controlling the scanning of the energy source over the layer of the mixed build material.

An exemplary method of additively manufacturing a three-dimensional component includes mixing a primary feedstock material with a secondary material to form an intermixed build material, introducing a layer of the intermixed build material to a build surface, scanning one or more energy sources over the layer of the intermixed build material, raising a temperature of the intermixed build material to an activation temperature of the second material, and removing the one or more energy sources. Scanning the one or more energy sources over the layer of the intermixed build material results in at least a portion of the primary feedstock material reaching its melting point and forming a melt pool. Raising the temperature of the intermixed build material to an activation temperature of the secondary material causes the release of gaseous product from the second material, as well as the generation of gas pockets within the melt pool. Removing the one or more energy sources results in the melt pool solidifying such that the generated gas pockets become trapped within the solidified melt pool to form a three-dimensional porous layer.

Mixing the primary feedstock material with the secondary material can include mixing a powdered form of the primary feedstock material and a powdered form of the secondary material. In some embodiments, the activation temperature of the secondary material can be lower than the melting point of the primary feedstock material. In other embodiments, the activation temperature of the secondary material can be higher than the melting point of the primary feedstock material.

In some embodiments, the method can further include controlling at least one of a temperature of an environment surrounding the build surface or a build pressure to control a size and density of the generated gas pockets within the melt pool. In some embodiments, introducing a layer of the intermixed build material to a build surface can include spreading the intermixed build material over the build surface.

BRIEF DESCRIPTION OF DRAWINGS

This disclosure will be more fully understood from the following detailed description taken in conjunction with the accompanying drawings, in which.

GENERAL DESCRIPTION

Figure 1:
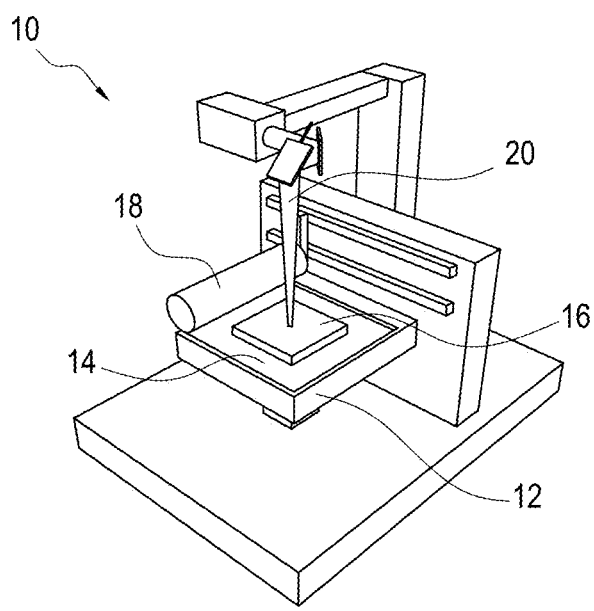
FIG. 1 is a schematic perspective view of a known AM printer.

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. By way of non-limiting example, terms such as "manufacturing," "building," and "printing" may be used interchangeably herein and a person skilled in the art will understand the same. An additional non-limiting example includes the using terms such as "primary feedstock material," "primary material," and "feedstock material" interchangeably herein, and a person skilled in the art will understand the same. Still further, the present disclosure provides some illustrations and descriptions that includes prototypes, bench models, and or schematic illustrations of set-ups. A person skilled in the art will recognize how to rely upon the present disclosure to integrate the techniques, systems, devices, and methods provided for into a product, such as a consumer-ready, factory-ready, or lab-ready three-dimensional printer.

The term "build surface" as used herein refers to a surface on which a new layer of build material (e.g., a primary feedstock material, a secondary material, an additional material, a mixture of materials, combinations thereof, etc.) is placed where at least a portion of the new layer of build material will subsequently be irradiated by an energy source to form a next layer of a three-dimensional component being manufactured. By way of non-limiting example, a build surface can be at least a portion of a build platform of an AM device, a powder bed, or a previously irradiated layer of build material. A "layer" of build material can refer to build material placed on at least a portion of a build surface. In some embodiments, a layer can be approximately in the range of about 50 µm to about 100 µm. A layer of build material need not cover an entirety of the build surface. Rather, in some embodiments, a layer of build material can be placed over only a portion of the build surface. Accordingly, in some respects a layer can generally be considered to be a material, whether that material is being deposited or has already been deposited.

The term "primary feedstock material" refers to a primary material or a base material used in an AM process. In some embodiments, the primary feedstock material can be at least one of a powdered metal, a powdered pure metal, a mixture of pure metal powders, a powdered metal alloy, a resin, or a plastic. More particularly, in some embodiments, the primary feedstock material can include one or more of powdered magnesium, aluminum, iron, or titanium, alloys containing one or more of magnesium, aluminum, iron, or titanium, and/or a combination of these materials and/or other suitable primary feedstock materials. The term "secondary material" refers to a material used in an AM process in addition to the primary feedstock material. In some embodiments, a secondary material can be a gas generating agent (also referred to as a gassing agent or a foaming agent) which releases a gaseous product upon activation at a certain temperature. In some embodiments a secondary material can be a metallic hydride. Some non-limiting examples of secondary materials include titanium hydride ($TiH_2$), calcium carbonate ($CaCO_3$), and zirconium(II) hydride ($ZrH_2$). It will be appreciated that in a single AM process of manufacturing a component, the primary feedstock material, and the secondary material need not remain constant throughout the build. In other words, individual build layers of a three-dimensional component can be formed from different materials and with different material ratios. Moreover, some individual layers need not include a primary feedstock material and a secondary material. Alternatively, some individual layers may include one or more primary feedstock material(s) and/or secondary material(s) or additional powder material(s). In some embodiments, at least one of the primary feedstock material and the secondary material can be a granular powdered material.

The term "build pressure" refers to a pressure surrounding a vertical stage upon which a build platform is located during an AM process. In embodiments of the present disclosure that incorporate a pressure chamber, as will described in detail below, a build pressure can be the pressure within the pressure chamber. The term "spatially controlled" as used herein with reference to, for example, an energy source or a deposition element, refers to the ability of the energy source or the deposition element to be directed to a particular desired location and/or to follow a particular desired toolpath with respect to a build platform, build surface, or build plan. A person skilled in the art will be familiar with the term "build plan," which as used herein is one or more commands, often a string of commands, that direct an AM device how to print a desired three-dimensional part. The build plan can control one and up to all parameters and actions of the AM device. The build plan can be pre-established and loaded into the AM device, for instance via a computer, memory, etc., and/or it can be inputted, modified, formed, etc. during the printing process, which can be beneficial to the extent real-time feedback can be provided during the build process that may impact the build plan.

The present disclosure is generally directed to systems, devices, and methods for additive manufacturing that leverage precise control of atmospheric conditions of a build environment and/or a build material composition to produce higher quality parts, allow for wider material selection, and provide the ability to locally control a printed component density and/or composition. For example, by varying at least one of a relative material composition of a build material and a pressure surrounding a build platform, porosity of a three-dimensional component may be locally controlled.

Systems, methods, and devices for spatially grading a composition and/or density in an AM process, with or without atmospheric control, can include the use of one or more secondary material(s) in conjunction with one or more primary feedstock material(s) to locally control composition and/or porosity of a build on a layer-by-layer basis. In some embodiments, the secondary material can wholly, or substantially wholly, dissociate or sublime and release a gaseous product upon activation by heating and/or phase change. In other embodiments, only some constituents of the secondary material may evolve gas upon activation by heating and/or phase change while remnants of the secondary material can remain solid upon heating and form part of a bulk matrix of a three-dimensional component. As discussed in detail below, in some embodiments a secondary material can be locally deposited into a primary feedstock material. In other embodiments, a secondary material can be intermixed with a primary feedstock material to form a mixed build material which can then be placed upon a build surface. A characteristic size (e.g., a particle size) of the secondary material may be substantially smaller than a characteristic size of the primary feedstock material such that the relative composition of the three-dimensional component can be spatially controlled with high precision and uniformity. By way of non-limiting example, in some embodiments a secondary material can include a solid particle material having a characteristic size approximately in the range of about 1 nm to about 100 nm. A spatially controlled energy source, for example a laser, can locally heat the material (e.g., a primary feedstock material, a secondary material, a mixed build material, combination of these materials, etc.) on a build surface to cause at least a portion of the primary feedstock material to melt and form a melt pool. The secondary material may release a gas and/or remain solid while the primary feedstock material becomes molten, resulting in a structure with controlled porosity and/or composition upon cooling of the melt pool.

Alternatively, or additionally, systems, methods, and devices disclosed herein can be used for AM processes with integrated control of a build pressure. Atmospheric control of a build pressure during an AM process can expand build material selection, improve part quality, and provide an alternative method to control porosity and/or composition of a manufactured component. In some embodiments, a high-pressure shielding agent can be used in a pressure-controlled process to locally control structural void generation and part design.

Atmospheric Controlled Additive Manufacturing System

Figure 2:
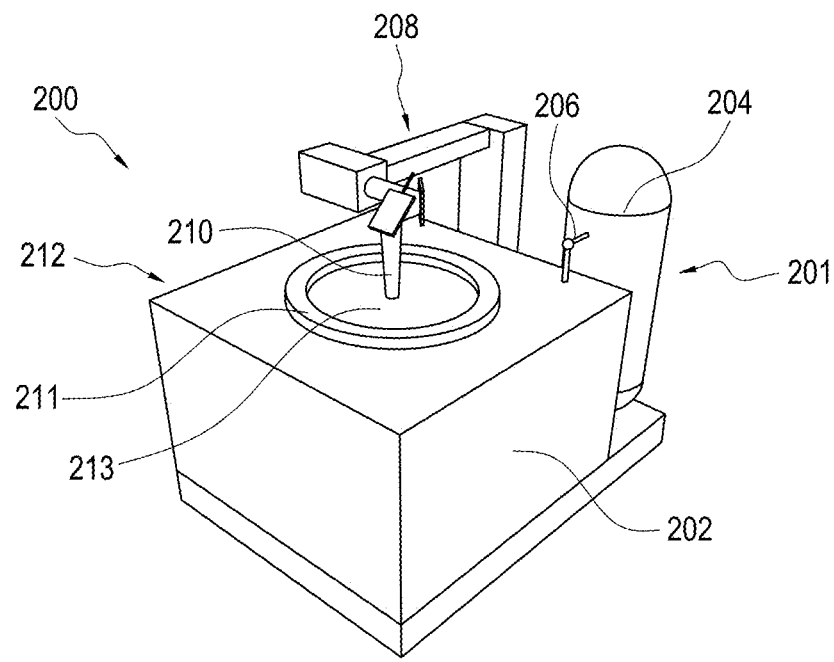
FIG. 2 is a schematic perspective view of one exemplary embodiment of an AM device, the AM device including a pressure control system'

FIG. 2 provides one exemplary embodiment of an atmospheric controlled additive manufacturing (ACAM) system 200 that includes a comprehensive atmospheric control system 201 and an SLM printer 208. The atmospheric control system 201 can include a pressure chamber (also referred to as a build chamber) 202 that is coupled to a pressure manager 204 by way of a fluid communication line 206. As will be described in detail below, components of the SLM printer 208 can be placed within the pressure chamber 202 such that controlling a pressure within the pressure chamber results in controlling a pressure surrounding a vertical stage (i.e., a build pressure) of the SLM printer. An energy source 210 of the SLM printer 208 can extend through a bore in an upper component 212 of the pressure chamber 202. In some embodiments, the upper component 212 of the pressure chamber 202 can include a top retainer 211 for a window 213 having a clear bore through which an energy source can extend into the interior of the pressure chamber. By way of non-limiting example, the window 213 can be made from a sapphire crystal. A rear of the pressure chamber (not shown) can feature one or more ports. The one or more ports can be used, for example, to evacuate the pressure chamber 202, to pressurize the pressure chamber, and/or to serve as a sample point for measurement instrumentation (such as pressure/vacuum gauges).

Figure 3:
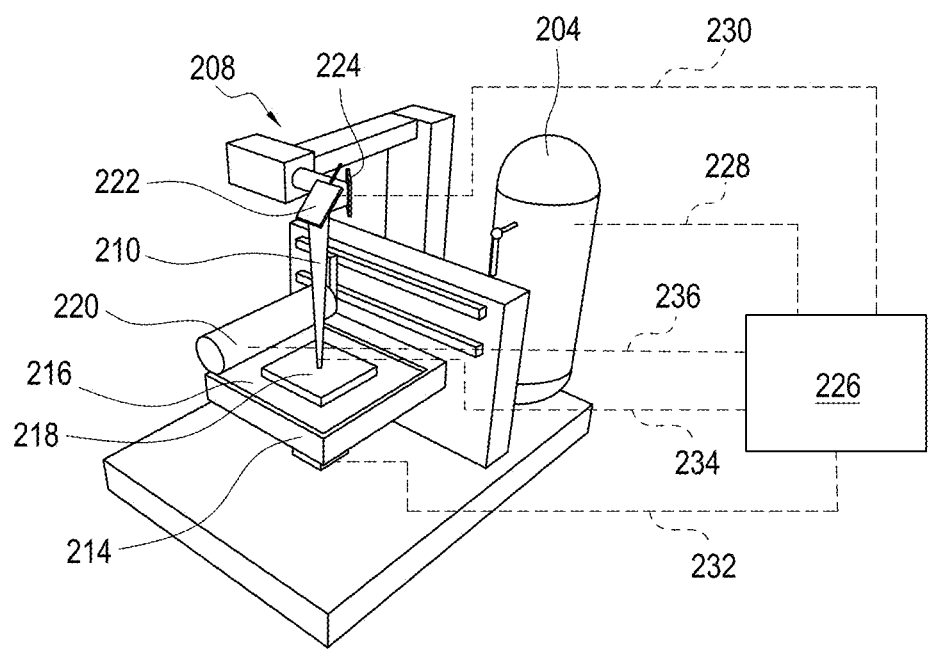
FIG. 3 is a schematic perspective view of the AM device of FIG. 2 with a pressure chamber removed.

FIG. 3 shows the ACAM system 200 of FIG. 2 with the pressure chamber removed, rendering components of the SLM printer 208 that are placed within the pressure chamber visible. The SLM printer components within the pressure chamber can include, among other components, a vertical motion stage 214, a build platform 216, a powder bed 218, and a recoater 220. As shown, the vertical motion stage 214 can have the build platform 216, or any other object, disposed thereon. The powder bed 218 can be placed on the build platform 216, with the powder bed 218 being the material from which a three-dimensional part is constructed. The recoater 220 can be coupled to the build platform 216 and used to distribute a substantially thin, substantially even coating of a powdered build material (e.g., from a powder supply well or the powder bed 218) over the build platform 216. A person skilled in the art will understand what constitutes a substantially thin and/or substantially even coating, depending, at least in part, on the desired size of the three-dimensional part being produced and the dimensions and properties and/or characteristics of the materials being used to produce the part. In some embodiments, the powdered build material can include magnesium. More particularly, in some embodiments the powdered build material can be pure magnesium. In some embodiments, the recoater 220 can be coupled to a deposition element (not shown) that provides powdered build material from a build material supply well to the recoater 220. The powdered build material placed by the recoater 220 can form some or all of a new build layer of the powder bed 218 and/or a resulting three-dimensional part.

The energy source 210 can be a steerable energy source (i.e., a spatially controlled energy source) and, for example, a steerable laser. The energy source 210 can be used to selectively irradiate at least a portion of build material of a new build layer on a build surface, the build surface being, for example, the build platform 216 and/or previous layers of the build material already deposited as part of the three-dimensional object being produced. At least a portion of the build irradiated, i.e., locally heated, by the energy source can melt and form a melt pool of molten material. It will be appreciated that the energy source need not irradiate an entire layer of the build material on the build surface for a particular build layer. Rather, in some embodiments, the energy source can be scanned over one or more desired location(s) on the build surface. In some embodiments a laser beam from the laser 210 can be steered and/or directed over build material on the build platform 216 using one or more galvanometer mirrors. In the illustrated embodiment, a first mirror 222 and a second mirror 224 can be used to direct a laser beam from the laser 210. The first and second mirrors 222, 224 can be controlled by a controller 226 that can send one or more signals to direct and control the movement of the first and second mirrors 222, 224. The controller 226 can also be used to control other aspects of the system 200. By way of non-limiting example, the controller 226 can be in communication with the energy source 210 to control its activation.

A further, non-limiting example of how the controller 226 can control various components of the system 200 is that the controller 226 can communicate with the pressure manager 204 via a first communication line 228, with one or more galvanometer mirrors, e.g., the mirrors 222 and 224, via a second communication line 230, with the vertical motion stage 214 via a third communication line 232, with the energy source 208 via a fourth communication line 234, and/or with the recoater 220 via a fifth communication line 236. It will be appreciated that the controller 226 can communicate with additional components of an ACAM system or fewer components of an ACAM system than those specifically listed herein. By way of non-limiting example, a controller 226 can receive data from one or more sensors associated with the ACAM system. Further, the controller 226 can be operated and/or controlled based on a build plan. The build plan can be pre-established and communicated to the controller 226, and/or it can be created, modified, and/or updated during the printing process.

The atmospheric control system 201 can regulate a pressure inside the pressure chamber 202 (i.e., a build pressure) and/or control an atmospheric content of an environment surrounding the vertical stage. In some embodiments, the atmospheric control system 201 can regulate the build pressure to a pressure greater than standard atmospheric pressure for at least a portion of an AM build process. The atmospheric control system can include protective safety features which, in some embodiments, can prevent pressurization of the pressure chamber above a desired upper limit (e.g., 750 psig). For example, a pressure threshold can be set to a desired upper limit (e.g., 750 psig).

The atmospheric control system 201 can receive a desired pressure profile to maintain during at least a portion of operation of the ACAM system 200. In some embodiments the controller 226 of the ACAM system can provide a pressure profile to the atmospheric control system 201, for instances as part of a build plan. In other embodiments, a user can directly input or program the atmospheric control system. The atmospheric control system can also receive information related to an energy source power and/or positioning of one or more components of the system 200, and can incorporate this information into control of the build pressure and/or atmospheric content. In some embodiments, the atmospheric control system 201 can operate in a closed-system configuration by bringing a build pressure to a desired threshold pressure and only adding or releasing gas from the pressure manager 204 to maintain the threshold pressure and/or the desired pressure profile. In other embodiments, the atmospheric control system 201 can operate in an open-system configuration. In such embodiments, a containment gas can recirculate through the system (e.g., through pressure chamber 202) by way of the atmospheric control system 201 to allow for continuous gas monitoring, content control, and/or flow control. Advantageously, an open-system configuration can permit a flow of evaporated metal condensate away from an energy source of the AM device to ensure that incident energy from the energy source reaches the powder bed unimpeded.

In some embodiments, the atmospheric control system 201 can regulate a build pressure such that the build pressure is greater than standard atmospheric pressure for at least a portion of an additive manufacturing process. This stands in contrast with existing SLM technology, which typically operates at an atmospheric or sub-atmospheric pressure. For certain materials, such as metals and alloys, increasing pressure results in an increased temperature gap between a melting temperature and a boiling temperature of the material. This can be significant because an increased temperature gap between the melting and boiling points of a material can allow for a greater range in operating temperatures for an AM device before an AM process runs the risk of excessively vaporizing a build material and/or altering percentages of an alloying elements(s) in a build material via evaporation. Increasing a processing temperature envelope in this manner, i.e., a temperature range between a melting point and a boiling point, can allow for an expansion of materials that can be used in an AM process by damping melt pool dynamics.

Figure 4:
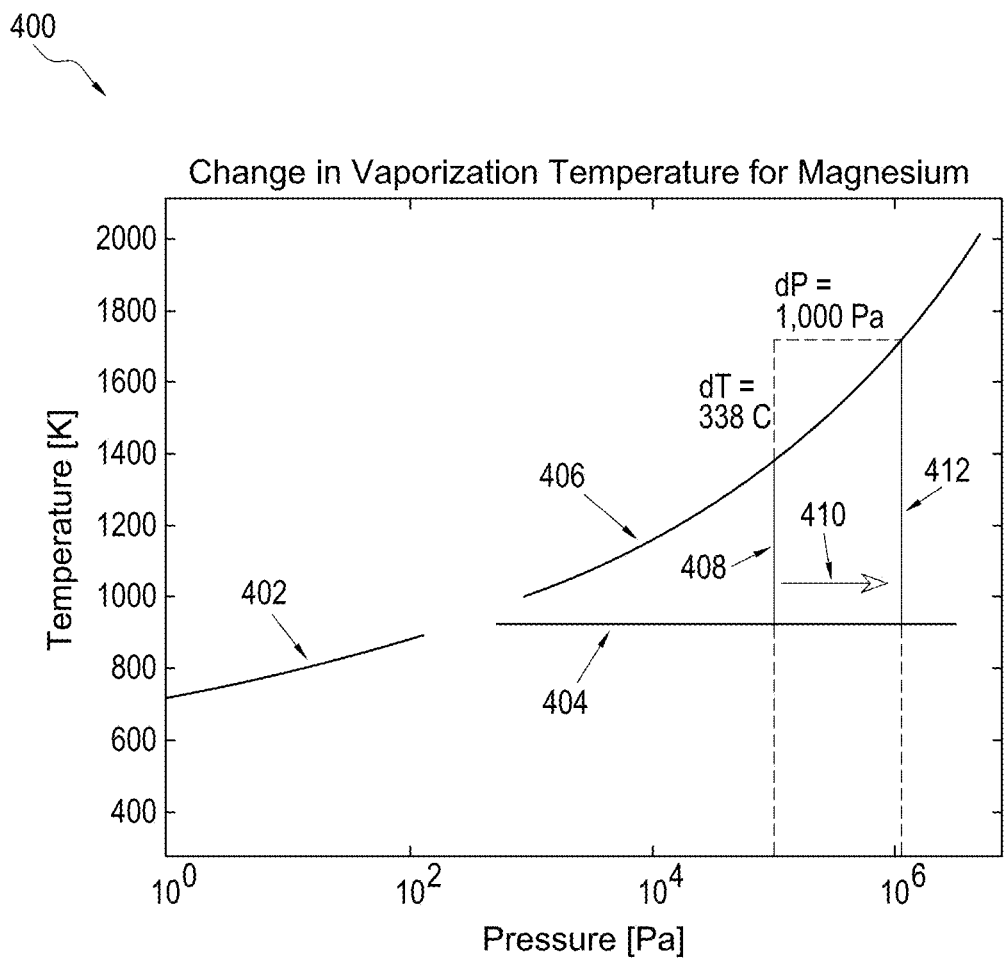
FIG. 4 is an estimated phase diagram for magnesium.

For example, increasing a build pressure can enable magnesium to be used as a build material in an AM process. FIG. 4 is an estimated phase diagram 400 for magnesium showing an approximate solid-vapor transition line 402, a solid-liquid transition (melting) line 404, and a liquid-vapor transition (boiling) line 406 plotted as a function of pressure. At atmospheric pressure of 101.3 kPA, a gap 408 between a melting point and a boiling point of magnesium is only about 452° C. Due to this narrow gap between the melting and the boiling points of magnesium, pure magnesium cannot be used in current SLM processes as such processes cannot effectively melt the magnesium without excessive vaporization. This issue, inherent with magnesium and many other metals, can be addressed by using an atmospheric control system in conjunction with an SLM printer, for example the ACAM system 200 described above, to control pressure of a build environment to increase a temperature gap between a melting point and a boiling point of the material.

As illustrated by arrow 410 on the phase diagram 400, increasing a pressure of magnesium increases the boiling point along transition line 406 while the melting point along line 404 remains essentially unchanged. More particularly, increasing a pressure to approximately 10 times atmospheric pressure increases the boiling temperature to about 790° C. while the melting temperature remains essentially unchanged, resulting in an increased operating range 412 of an AM process. The increase in pressure affords an additional approximately 338° C. of temperature range over which an AM system can operate without vaporizing the magnesium. This increase in the operating temperature range allows for greater process control and can eliminate the need for alloying of a build material to elevate the build material boiling point. Accordingly, pure or more pure forms of powdered magnesium can effectively be used as a primary feedstock material in AM processes using atmospheric pressure control as disclosed herein.

In addition to expanding a range of materials that can be used in an AM process, control of atmospheric parameters during AM can yield better part quality with existing materials. Manufactured parts can achieve better material performance and surface finish due to the interplay between an increased build pressure and surface dynamics at a melt pool surface. There are complex liquid-gas interface dynamics that arise out of the presence of a pool of molten material during an SLM AM process. High-velocity convection currents and a plume of vapor condensate can result from a high-velocity ejection of material at the liquid-gas interface because of molten build material being vaporized by energy input in to the build material from a laser or other energy source. The convection currents and vapor plume can interfere with the AM process as jets of gas push the melt pool around and the vapor plume can interfere with incoming laser energy. These complex dynamics can lead to erratic melt pool movement resulting not only in poor part feature formation as the melt pool deviates from a desired path, but also defect generation in the formation of voids.

Using an atmospheric control system, as disclosed herein, to control a build pressure can suppress high-velocity jets and other surface phenomena by suppressing a release of vapor from the build material at the liquid-gas interface of the melt pool. An increase in build pressure can reduce the vapor pressure of the molten build material, reducing the amount of vapor that ejects or escapes from the liquid-gas interface of the melt pool. It is this material escape that can create both the high-velocity convection currents that push on the melt pool and the vapor plume that can interfere with energy delivery. Thus, by reducing the mass transfer at the liquid-gas interface through increased pressure, the vapor convection currents and vapor plume can be minimized, resulting in a more stable melt pool, more consistent energy transfer, and ultimately better build quality.

Method of Conducting an AM Process

Figure 5:
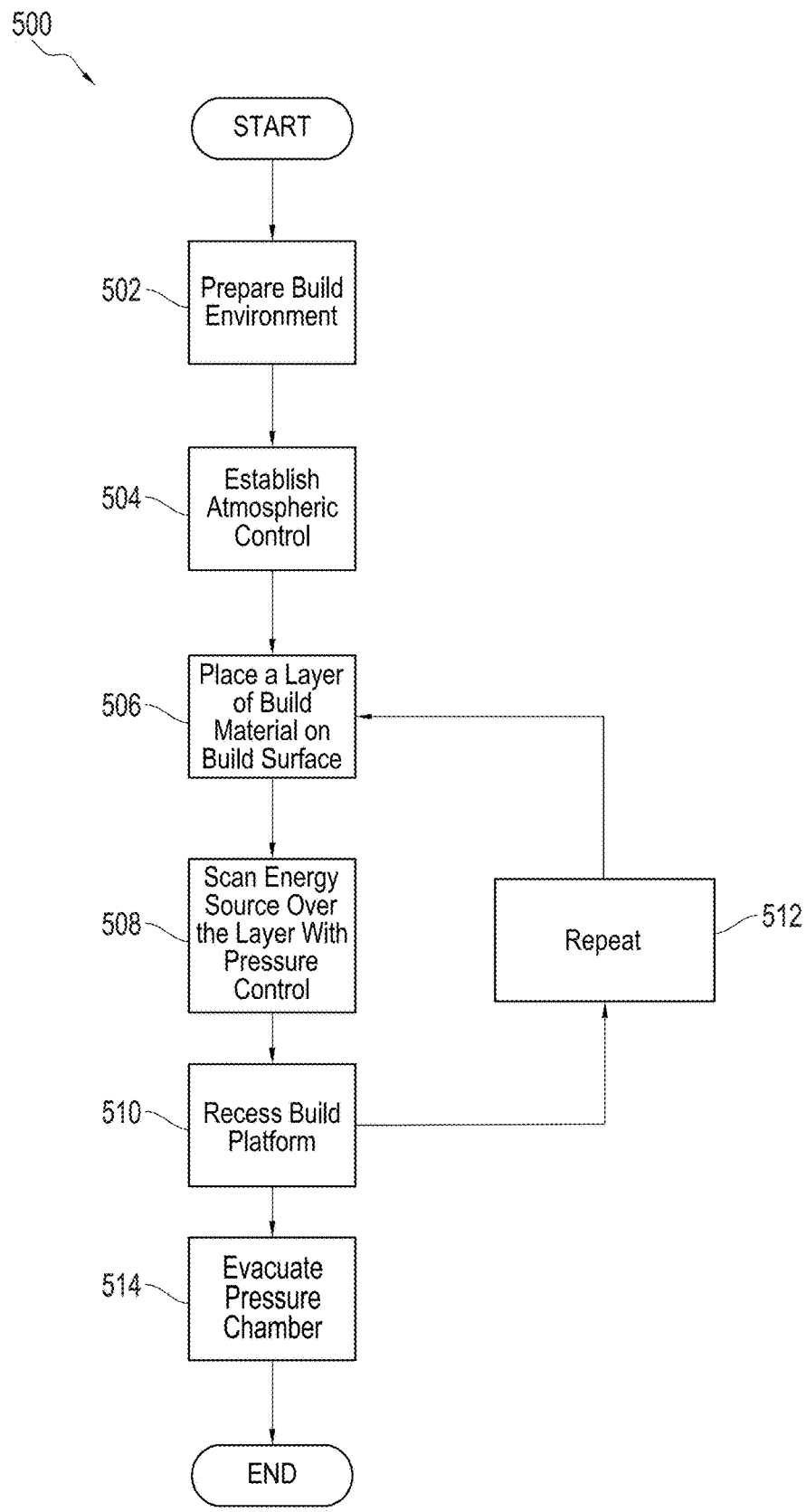
FIG. 5 is a flowchart illustrating one exemplary method of manufacturing a three-dimensional component with a pressure control system.

FIG. 5 shows a flowchart of a method 500 related to one exemplary embodiment for performing an AM process incorporating an atmospheric control system. In some embodiments, the method 500 can be carried out using an ACAM system such as the ACAM system 200 described above including an SLM printer and an atmospheric control system with a pressure chamber.

The method can begin by preparing a build environment at step 502. Preparing the build environment can include performing actions to ready an AM device for manufacturing a three-dimensional component. For example, a new build platform can be cleaned and loaded into a recoater of an SLM printer. The recoater can be electrically connected to raise the build platform, by way of a vertical motion stage, into a printing position. A powder well of the SLM printer can be loaded with fresh powdered build material and placed within a pressure chamber. In some embodiments, the build material can include magnesium. A build plan can be created and/or loaded for use in producing the desired three-dimensional component.

In step 504, atmospheric control can be established by the atmospheric control system. The pressure chamber can be sealed and inerted, thereby bringing the pressure chamber up to a desired pressure by introducing an inert gas(es). The atmospheric control of a build pressure (i.e., a pressure of an environment surrounding the vertical stage) within the pressure chamber can then begin. Controlling the build pressure can include any of the atmospheric control systems or methods described herein. For example, as discussed above, atmospheric control can include at least one of regulating the build pressure and controlling an atmospheric content of an environment surrounding the vertical stage. In embodiments regulating the build pressure, this can include establishing an open-circuit purge flow and continuously recirculating a containment gas through the pressure chamber at a desired pressure. Alternatively, the atmospheric control system can operate in a closed-circuit configuration by bringing the build pressure to a threshold pressure and adding or removing gas to the build environment within the pressure chamber to maintain the threshold pressure and/or in accordance with a desired pressure profile. In some embodiments, the atmospheric control system can regulate the build pressure to a pressure greater than standard atmospheric pressure.

At step 506, a layer of powdered build material can be placed on a build surface. In some embodiments a recoater can place the layer of the powdered build material on the build surface. The recoater can receive the build material from a supply well of the SLM printer, and spread a layer of the received build material over the build surface. The layer of powdered build material can include at least one of a primary feedstock material and a secondary material. In some embodiments, the layer of build material can be placed in accordance with a build plan and/or as instructed by a controller sending signals to the recoater. A build surface can include at least a portion of the build platform, a powder bed, a previously irradiated layer of build material, or an additional layer of powdered material.

While controlling the build pressure, one or more energy sources can be scanned over at least a portion of the layer of powdered build material at step 508. Such scanning can irradiate at least a portion of the layer of powdered build material and cause at least partial fusion of the build material. Scanning the one or more energy sources over at least a portion of the layer of powdered build material can locally heat at least a portion of the build material to form at least one melt pool of build material. In some embodiments, controlling the build pressure can include controlling the build pressure to suppress evaporation of the powdered build material during fusion of the build material. For example, controlling the build pressure can include controlling the build pressure to a pressure greater than standard atmospheric pressure.

In some embodiments, the one or more energy sources can be spatially controlled energy sources such that the energy delivered from the one or more energy sources can be spatially controlled with respect to the build platform. For example, a controller can send control signals to the one or more energy sources and/or to one or more galvanometers configured to direct energy from the one or more energy sources, to direct the energy from the one or more energy sources to a desired location or along a desired path.

The build platform can be recessed at step 510, following the scanning of the one or more energy source. In some embodiments, the build platform can be recessed by an amount that corresponds to a layer height in preparation for repeating the build process one or more times to produce a three-dimensional object (step 512). More particularly, after recessing the build platform, the method can return to step 506 and an additional layer(s) of build material can be introduced on to a build surface. As discussed above, the build surface can be at least a portion of the build platform, a powder bed, a previously irradiated layer of build material, and/or one or more additional layers of build material. The process can continue with step 508 by scanning one or more energy sources over at least a portion of the additional layer(s) while controlling a build pressure to form at least one melt pool of the build material and fuse at least a portion of the additional layer(s) of the build material. In some embodiments, the one or more energy sources can be the same one or more energy sources as previously used in the method 500, while in other embodiments the one or more energy sources can be different energy source(s) upon repeating the step 508 one or more additional times. Further, a person skilled in the art will recognize that other movements of the build platform, in addition to or in lieu of recessing, can be utilized without departing from the spirit of the present disclosure.

In some embodiments, controlling the pressure while scanning one or more energy sources over an additional layer(s) of build material can include regulating the build pressure at a pressure at which the one or more energy sources were previously scanned over a prior layer(s) of build material. Alternatively, controlling the pressure while scanning the one or more energy sources over an additional layer(s) of build material can include adjusting the build pressure to a different pressure level. As discussed above, a build pressure can influence the melt pool and AM process dynamics. Accordingly, in some embodiments, adjusting the build pressure to a different pressure level, as compared to a pressure level of a previous energy source scan, can result in changes to porosity and/or composition of the scanned layer of build material. It will be appreciated that steps 506-512 can be repeated one or more times to build a multi-layer three-dimensional component.

At the completion of the build (i.e., when the AM printing of a three-dimensional component is completed), the pressure chamber can be evacuated at step 514. In some embodiments, completion of the build can occur after a single pass through steps 502-510. In other words, in some embodiments there is no need to repeat (step 512) a portion of the method as a desired three-dimensional component is complete. After evacuating the pressure chamber (step 514) after one or more layers of build material have been irradiated, the three-dimensional part can be removed from the SLM printer. In some embodiments, after removing the three-dimensional component, the component can undergo any number of post-processing and/or inspection steps.

AM Process with a High-Pressure Shielding Agent

FIGS. 6A-6E schematically illustrate steps in an exemplary method of AM with atmospheric control to control void generation, i.e., porosity, of a three-dimensional manufactured component. Such a method can allow for production of density-graded parts by controlling porosity on a layer-by-layer basis during the AM build process. As will be described in detail below, an exemplary method can include introducing a small-molecule gas shielding agent (also referred to as a "gassar") under high-pressure to a build environment such that the gassar drives void generation within the build material. An energy source can locally heat at least a portion of the build material under the high-pressure to form a melt pool, which subsequently cools into a solidified build material. A build pressure can then be reduced below the pressure at which the shielding agent was introduced, and one or more post-processing steps can be performed that result in generation of voids within the build material of an AM three-dimensional part. In this manner, an ACAM system can be used to control a build pressure during an AM process to generate cellular voids. The method illustrated in FIGS. 6A-6E can be performed by an AM device with an atmospheric control system. By way of non-limiting example, an ACAM system, such as the system 200 described above with respect to FIGS. 2 and 3, can be used.

Figure 6A:
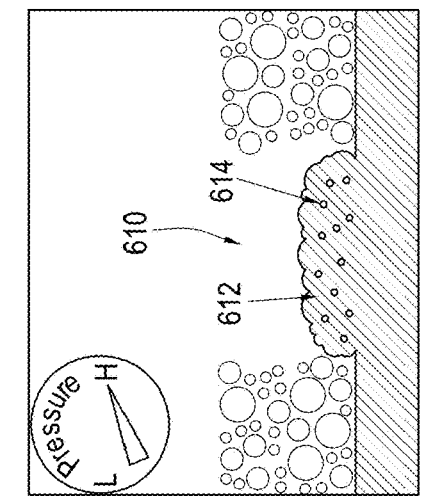
FIGS. 6A-6F schematically illustrates steps of an exemplary method of manufacturing a three-dimensional component with controlled characteristics using a high-pressure shielding agent.

FIG. 6A illustrates a first step of an exemplary method. A layer of a powdered build material 600 can be placed on a substrate (e.g., a build surface 602). A build pressure can be controlled by an atmospheric control system by introducing a small-molecule gas 604 as a shielding agent under high-pressure. By way of non-limiting example, in some embodiments the small-molecule gas can be helium. Other suitable gases include, but are not limited to, argon, nitrogen, oxygen, carbon dioxide, and hydrogen. With a build pressure above standard atmospheric pressure, some small-molecule gasses can diffuse into a build material melt pool during the melting process to generate pores through post-processing of the solidified build material component. Such small-molecule gasses (also referred to as "high-pressure gassars") can be dissolved into a molten melt pool due to an elevated solubility that comes from increased atmospheric pressure when the build pressure is above standard atmospheric pressure.

Figure 6B:
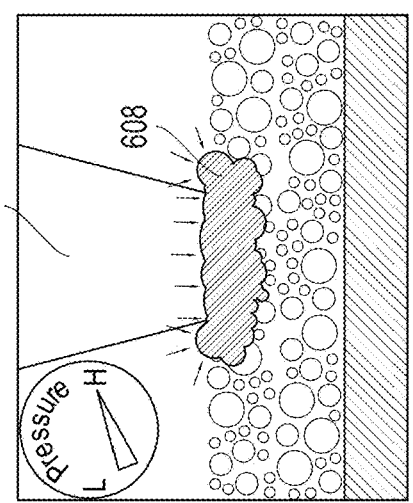
Figure 6C:
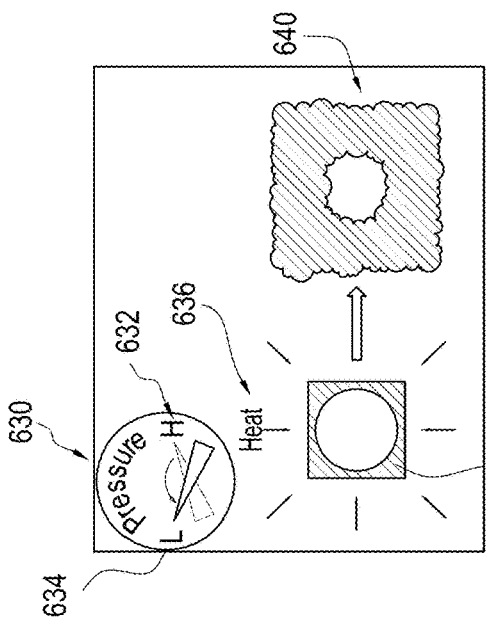

Next, as shown in FIG. 6B, a laser beam 606 (or other energy beam or the like) from an energy source (not shown) can be scanned over at least a portion of the build material 600 to melt at least a portion of the powdered build material and form at least one melt pool 608 of molten build material. While the melt pool 608 of build material is in the molten state, at least a portion of the high-pressure gassar 604 can diffuse into the melt pool under the high pressure of the build environment. As the laser beam 606 moves away or is otherwise removed, the melt pool 608 of build material can solidify, trapping pockets of the high-pressure gassar dissolved gas within the solidified build material. FIG. 6C schematically illustrates solidified build material 610, which can form because of the cooling of melt pool 608 once the laser beam 606 ceases delivery of energy to the pool. The solidified build material 610 includes molecules of the high-pressure gassar, for example the gas pockets 612 and 614, that were trapped within the solidified material as the melt pool cooled while the build pressure remained at the high-pressure. As illustrated by a pressure gauge illustrated in each of FIGS. 6A-6C, the method steps of 6A-6C can all be performed while an atmospheric control system controls the build pressure to a pressure that is greater than standard atmospheric pressure (where a pressure proximate to H on the gauge exceeds standard atmospheric pressure).

Figure 6D:
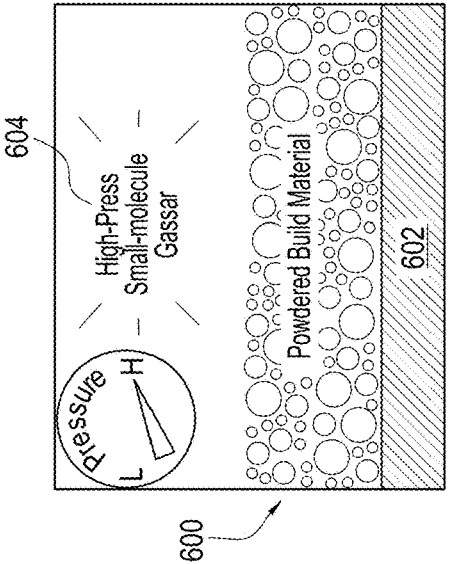

Next, one or more secondary processing steps can be performed that can cause the trapped pockets of high-pressure gassar to expand and generate cellular voids within the solidified build material. In some embodiments, at least a portion of the trapped pockets of high-pressure gassar can evolve out of the build material. FIG. 6D illustrates a secondary processing step that is performed at a pressure lower than the pressure at which the gassar was introduced. More particularly, an energy source 616 is reheating the solidified build material under a reduced pressure (i.e., a pressure lower than the pressure at which the gassar was introduced, as illustrated by the pressure being proximate to L on the pressure gauge of FIG. 6D) to a temperature that sufficiently reduces the strength of the solidified build material, causing the solidified build material to soften and allowing at least a portion of the trapped high-pressure gassar to expand. In some embodiments, the energy source 616 of the secondary processing can be the same energy source used to form melt pools from the build material (FIG. 6B) but controlled in a manner such that a reduced amount of energy is delivered to prevent the formation of melt pools. In other embodiments, the energy source 616 of the secondary processing can be a different energy source. FIG. 6D shows a softened build material 618 (i.e., the solidified build material 610 heated by the energy source 616) with expanded trapped gas molecules of the high-pressure gassar 620 and 622. The reduced pressure, combined with the softened build material, can result in void generation within the build material as the trapped gas evolves out of the softened build material.

Figure 6E:
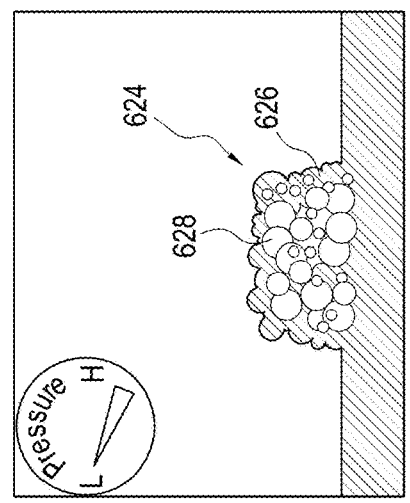

FIG. 6E illustrates a final porous structure 624 that can result once the energy source 616 is removed and the softened build material 618 completely re-solidifies. As can be seen, the final porous structure 624 includes solidified build material 626 along with a plurality of voids 628. The above described steps of FIGS. 6A-6E can be repeated for a plurality of build layers to form a multi-layer three-dimensional component.

Figure 6F:
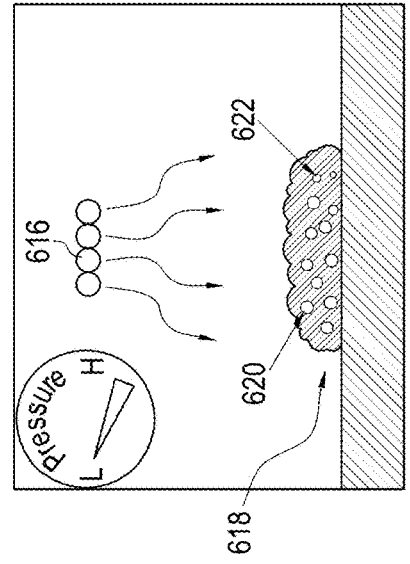

FIG. 6F schematically illustrates the transformation of an exemplary three-dimensional AM part before and after a secondary processing step, as described above with reference to FIGS. 6D and 6E. As shown, a pressure gauge 630 schematically represents a build pressure, for example a pressure in a pressure chamber of an ACAM system. The build pressure can be adjusted from a high pressure 632 of a melt pool formation process to a reduced pressure 634 for the secondary processing step. Once the pressure is reduced, heat 636 can be applied to a solidified build material having molecules 638 of a high-pressure shielding agent trapped therein. As described above, temporary application of heat at the reduced pressure results in the expansion and escape of at least a portion of the trapped molecules of the high-pressure shielding agent, and, ultimately, results in a porous final component 640. Using an exemplary method as described with reference to FIGS. 6A-6E, or variants thereof provided for herein or otherwise derivable by a person skilled in the art in view of the present disclosures, a porosity of an AM component can be controlled by adjusting one or more factors such as a gas used as a high-pressure shielding agent, a pressure at which the shielding agent is introduced under, time and/or energy input into the powdered build material by an energy source to form at least one melt pool, a pressure that serves as a reduced pressure level for a secondary processing step, and/or time and/or energy input into the solidified build material during the secondary processing to soften the build material. In some embodiments, factors may be held constant across the AM process for a plurality of layers of a final component such that porosity is substantially uniform across the plurality of layers. In other embodiments, one or more of the above factors can be adjusted such that porosity of a final component can be varied across one or more build layers.

AM Process and System with a Secondary Material

Systems, methods, and devices disclosed herein for controlling composition and/or porosity in AM components can include the addition of a secondary material to a primary feedstock material (also referred to as a feedstock material, base material, or primary material). The secondary material can be a gas generation agent (also referred to as a gassing agent), while the primary feedstock material can be a powdered structural build material. As described in detail below, a secondary material can be deposited onto a build surface or a secondary material can be intermixed with a primary material to form a mixed build material to be introduced to a build surface. A characteristic size (i.e., a particle size) of the secondary material may be substantially smaller than a characteristic size of the primary material, such that a relative composition can be spatially controlled with high precision and uniformity.

In some embodiments the secondary material can be a powdered or a liquid gas generation agent such that the secondary material releases a gaseous product upon heating. More particularly, a secondary material can release a gaseous product upon being raised to a temperature at or above an activation temperature. Gaseous compounds can be produced and released by a secondary material through a variety of ways, for example, through decomposition, such as titanium hydride evolving hydrogen gas, through reaction with the primary feedstock material, such as silicon carbides decomposing in the presence of magnesium carbide, or through vaporization. Non-limiting exemplary primary and secondary materials are provided earlier in this disclosure.

The secondary material can be activated (i.e., heated to or above an activation temperature) during an AM process directly, for instance by energy being input from one or more energy sources that causes at least a portion of the primary material to melt and form a melt pool. Additionally, or alternatively, the secondary material can be activated indirectly, for instance by thermal energy from at least one melt pool as the melt pool propagates through the build material, by thermal energy conducted through a build platform, and/or by thermal energy conducted through a previously irradiated build layer. In embodiments in which the secondary material is intermixed with the feedstock material to form a mixed build material, in contrast to a controlled deposition of the secondary material, the mixed build material can be placed onto a build surface by a recoater, such as the recoater 220 described above or a deposition element 702 described below.

Additionally, some embodiments of the systems, methods, and devices incorporating a secondary material in an AM build process as described herein, can further include features of an atmospheric control system, as described above (e.g., the system 200), to control a pressure of an environment surrounding a build platform (i.e., a build pressure). The control of atmospheric build parameters along with the inclusion of a secondary material can provide for unique feature generation of an AM component.

Figure 7:
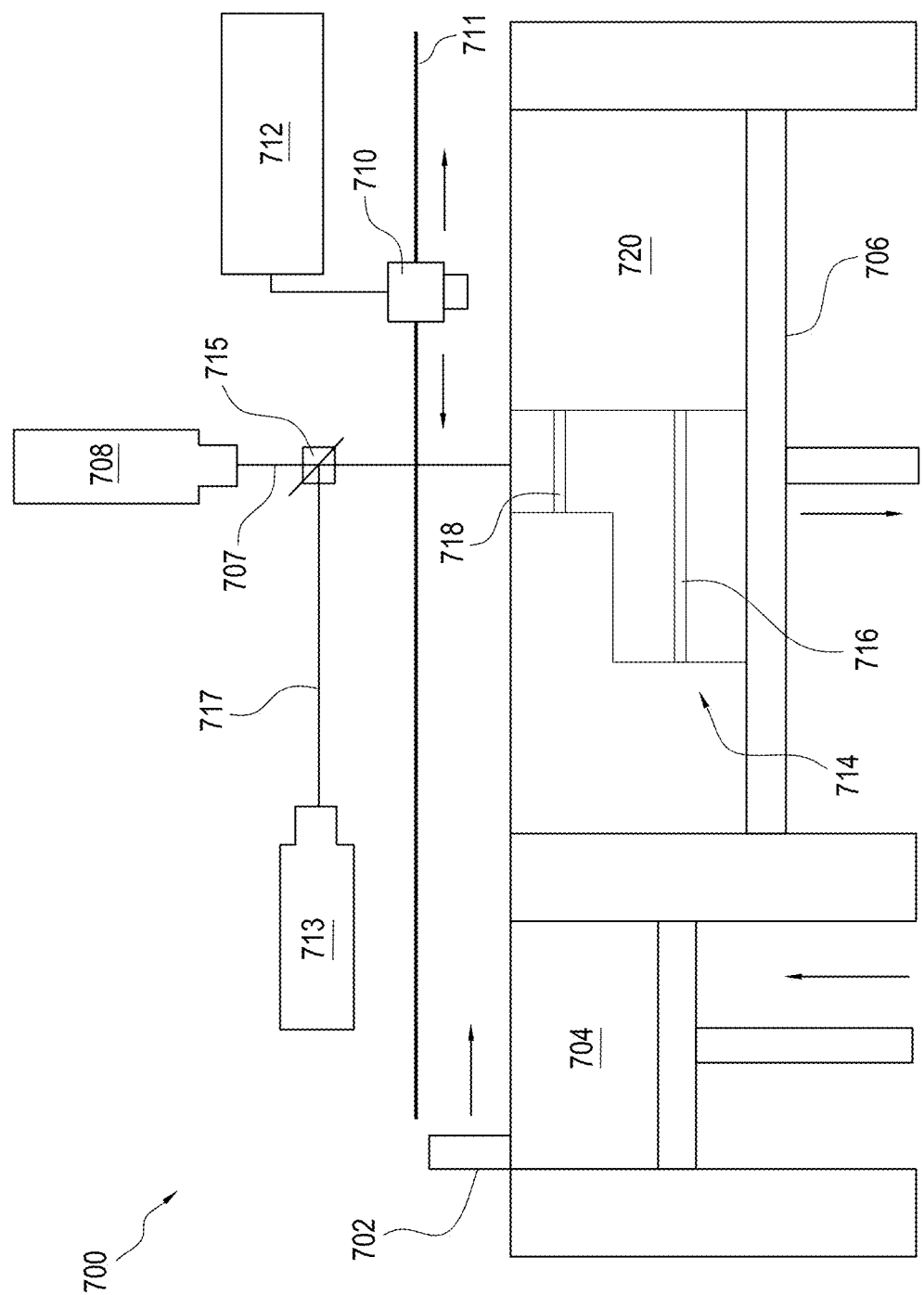
FIG. 7 is a schematic side view of an exemplary embodiment of an AM device for producing a three-dimensional component with controlled characteristics.

FIG. 7 shows an exemplary embodiment of an AM device 700 that can be used to manufacture a three-dimensional component with controlled spatial porosity and/or composition of the three-dimensional component. The device 700 integrates precision recoating, high resolution thermal metrology, and the capability to fabricate novel hybrid composites through selective doping of a powder bed and/or feedstock material by inkjet deposition. In some embodiments, the device 700 can be an SLM printer. The device 700 can include a deposition element 702 (e.g., a recoater) for depositing a primary feedstock, a build platform 706, an energy source (e.g., a laser) 708, and a spatial control element 710 (e.g., an inkjet printhead). In some embodiments, the deposition element can deposit a primary feedstock material onto a build surface from a powder supply well 704. The spatial control element 710 can deposit a secondary material from a secondary material well 712 onto a build surface, as will be discussed in detail below. The deposition element 702 and the spatial control element 710 can be configured to deposit their respective materials over multiple layers to form a three-dimensional object, with each layer capable of being spatially controlled to have a different composition and/or porosity. In some embodiments, depositing the primary feedstock material can include spreading the primary feedstock material over the build surface. The build platform 706 on top of which a component can be manufactured can be recessed following the melting of at least a portion of a primary material of a layer of build material such that a new layer of build material can be placed on a build surface.

The spatial control element 710 can be spatially controlled relative to a build surface to deposit the secondary material on the build surface. For example, the inkjet printhead can move in a controlled manner to a desired location, or along a desired path relative to the build surface to deposit the secondary material. In the illustrated embodiment, the inkjet printhead 710 can move along a rail 711 to adjust position along an "x-axis" (i.e., move left and right when looking at the page) with respect to the build surface. In some embodiments, the inkjet printhead can also move along a rail in a direction into and out of the page, such that there is bi-axial directional control of the inkjet printhead over the build surface. In some embodiments, a spatial control element 710 can receive signals from a controller to move the spatial control element to a desired position or along a desired path. Moreover, the spatial control element can selectively deposit the secondary material such that an entire build surface need not be covered by the secondary material. Rather, the spatial control element can deposit the secondary material in a desired pattern(s) or in one or more desired location(s) on the build surface.

Optionally, the device 700 can further include an optical monitoring system to observe and monitor a build process and/or final component. In the illustrated embodiment, the optical monitoring system can include a camera 713 and one or more galvanometers 715 to direct a viewing axis 717 of the camera to a desired area. Additionally, in some embodiments, the one or more galvanometers 715 can be used to direct an energy path 707 (e.g., a laser beam) from the energy source 708. The AM process may be monitored by one or more in-situ methods, such as thermal imaging of a build surface, computed tomography methods, and/or laser scanning of the build surface. In some embodiments, monitoring information from the optical monitoring system or other monitoring methods can be used to perform feedback control of the build process. For example, monitoring information can be used to maintain desired control of a local geometry of a heated area of the build material and a local density due to void generation within the heated area.

Depositing the secondary material using a spatial control element, such as inkjet printhead 710, can allow for a controlled deposition of the secondary material relative to a layer of deposited primary feedstock material, a build platform, and/or a previously irradiated layer of a three-dimensional component. While the illustrated device 700 shows the secondary material deposited by an inkjet printhead, there are a variety of ways to deposit the secondary material within the scope of the present disclosure. For example, the secondary material can be placed by patterning powdered secondary material particles and/or printing of powdered secondary material using colloidal suspensions, inkjet deposition printing, extrusion, and/or electrostatic printing. In this manner, a relative amount of the secondary material can be varied with respect to an amount and other properties and/or characteristics of the feedstock material to control porosity and/or composition of a particular layer in a three-dimensional component. The secondary material can be deposited by the spatial control element onto at least a portion of one of the build platform, the powder bed, a layer of the powdered feedstock material, and/or a previously irradiated layer of the three-dimensional component.

For example, as shown in FIG. 7, a three-dimensional component 714 is manufactured on the build platform 706. The component 714 has a first layer 716 and a second a layer 718 in which the spatial control element 710 deposited a secondary material from the secondary material well 712, resulting in a varied porosity of the first layer 716 and the second layer 718 from one or more other layers that form the component 714. The first and second layers 716, 718 may themselves comprise a plurality of layers, but for illustrative and ease of description purposes, is shown and described as a "first layer" and a "second layer." A powder bed 720 can be seen surrounding the part 714. The powder bed 720 results from powdered material, either the primary feedstock material or the secondary material, that has been deposited by the deposition element or by the spatial control element, but which was not irradiated by the energy source such that the material remains in powder form rather than a fused portion of the component 714.

The energy source 708 can locally heat at the secondary material and/or the primary feedstock material. In some embodiments, the energy source can be a spatially controlled energy source. As described above with respect to the spatial control element 710, a spatially controlled energy source 708 can be configured to move to a desired location or along a desired path with respect to a build surface. In this manner, the laser 708 can selectively irradiate at least a portion of build material on the build surface such that at least a portion of the primary feedstock material melts and forms one or more melt pool(s). In some embodiments, the secondary material can remain in a solid form while at least a portion of the primary material becomes molten such that upon solidification of the molten primary material, a composite of at least two solid phases is formed. In other embodiments, upon thermal activation, the secondary material can dissociate or sublime and release a gaseous product. At least a portion of the gaseous product can be trapped within at least one melt pool of the primary material such that when the melt pool cools upon removal of the energy source and subsequently solidifies, a porous solidified structure results.

As discussed above, the secondary material can be thermally activated (i.e., raised to a temperature above an activation temperature) in a variety of ways. In some embodiments, the laser 708 can directly heat at least a portion of the secondary material by irradiating the secondary material with a laser beam. Alternatively, or additionally, the secondary material can be indirectly thermally activated through thermal transfer from one or more melt pool(s) and/or by conduction of heat through the build surface a build plate and/or previously irradiated layer(s) of build material.

Depositing a Secondary Material onto a Build Surface

FIGS. 8A-8D schematically illustrate steps of an exemplary method of additive manufacturing a component. More particularly, as illustrated in FIGS. 8A-8D, the component can be formed using a secondary material deposited onto a build surface. As introduced above, in one embodiment a secondary material can be patterned or layered onto at least one of a build surface, a layer of powdered feedstock material on the build surface, a build platform, a powder bed, or a previously irradiated layer of build material. Such a process can leverage energy input by an energy source to the build surface and can, either directly or indirectly, activate at least a portion of the deposited secondary material such that the secondary material releases a gaseous product. In some embodiments the secondary material can wholly, or substantially wholly, sublime or dissociate upon activation, while in other embodiments at least a portion of the secondary material can remain solid. For example, in some embodiments a secondary material can be titanium hydride, which, upon activation, can release a gaseous product while titanium remains in solid form. The titanium can mix with the powdered build material to form a printed structure that includes a composite of at least two solid materials.

Figure 8A:
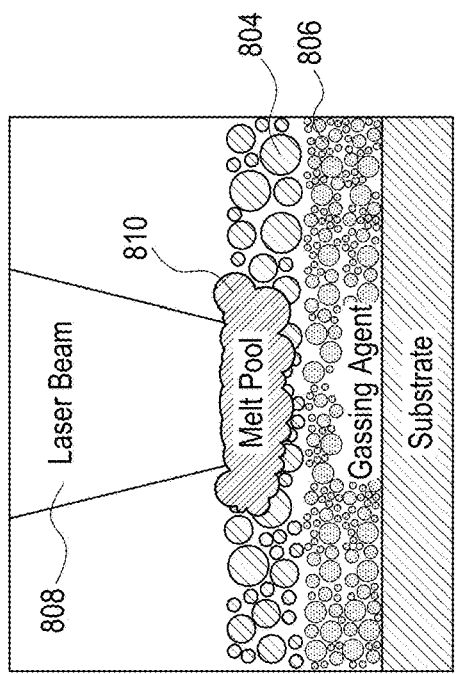
FIGS. 8A-8D schematically illustrate steps of an exemplary method of manufacturing a three-dimensional component with controlled characteristics using a primary feedstock material and a secondary material.

FIG. 8A schematically illustrates a build surface 802 having a primary feedstock material 804 and a secondary material 806 deposited thereon. The build surface 802 can include one or more of a build platform of an AM device, a powder bed, a powdered primary feedstock layer, a deposited secondary material, or a previously irradiated layer of material. In the illustrated embodiment, the secondary material 806 is deposited onto the build surface 802. In some embodiments, the secondary material can be deposited onto the build surface by a spatial control element in a desired pattern in accordance with a build plan. In some embodiments, the secondary material can be deposited with spatial control, for example by an inkjet printhead, such that a relative amount of the secondary material can be varied with respect to an amount and properties and/or characteristics of the primary feedstock material. By way of non-limiting example, alternative methods of depositing the secondary material can include directed colloidal deposition or mask deposition. A layer of the primary feedstock material 804 can then be introduced over the build surface, which in at least some embodiments, can include over the secondary material 806.

In some embodiments a layer of the primary feedstock material can be introduced onto a build surface, with a secondary material subsequently deposited onto at least a portion of the layer of the primary feedstock material. For example, a deposition element (e.g., a recoater) can introduce a layer of primary feedstock material to a build surface. A spatial control element (e.g., an inkjet printhead) can be operated over the layer of the feedstock material to deposit a secondary material onto at least a portion of the feedstock material.

Figure 8B:
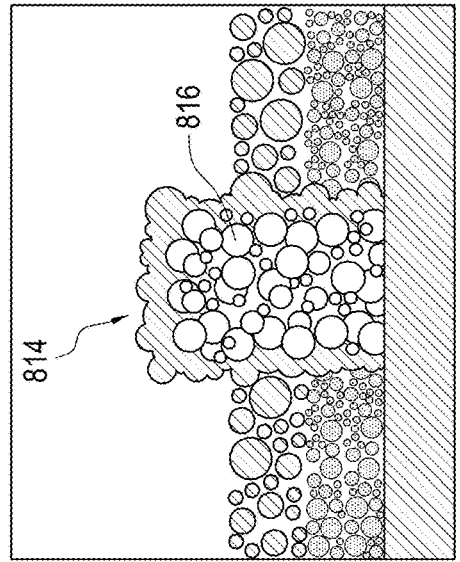

FIG. 8B shows an energy path (e.g., a laser beam 808) from an energy source (not shown) irradiating a portion of the powdered feedstock material 804 such that the powdered feedstock material melts to form a melt pool 810. The energy source can be scanned over at least a portion of the build surface to cause locally heating a secondary material that is deposited into a primary feedstock material and/or locally heating a primary feedstock material to become molten and form a melt pool while a secondary material remains solid. In the illustrated embodiment, the laser beam 808 directly and locally heats at least a portion of the layer of feedstock material 804, causing the primary feedstock material to melt and form a melt pool 810. As the melt pool 810 forms and descends through the primary material, the melt pool 810 can encounter the secondary material 806. In other embodiments, the energy source 808 can directly input thermal energy to a secondary material that is deposited onto a layer of a primary feedstock material. In such embodiments, heat from an energy source(s) can propagate through the secondary material, reaching at least a portion of the layer of the primary feedstock material to cause at least a portion of the layer of the primary feedstock material to melt and form a melt pool. While a single laser beam 808 is shown in the illustrated embodiment, one or more energy sources can be scanned over at least a portion of the build surface such that one or more energy paths can input thermal energy into build material on a build surface. In some such embodiments, multiple melt pools can be formed by locally heating a primary material.

Figure 8C:
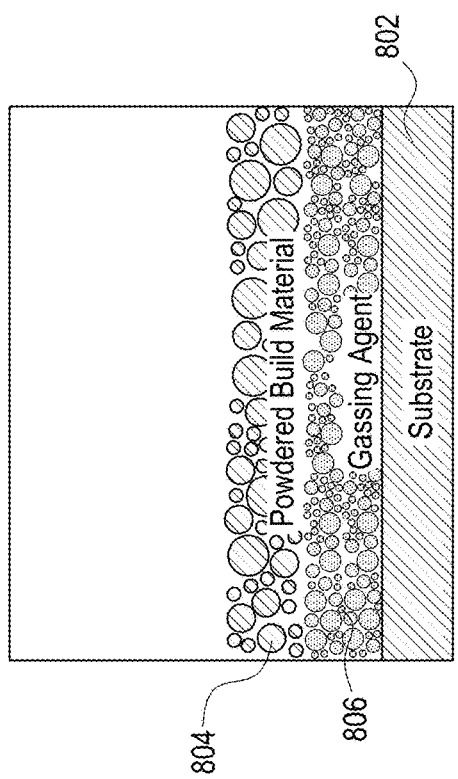

In a case where a sublimation or activation temperature of the secondary material is below or equal to the melting temperature of the primary feedstock material, contact of the secondary material with the melt pool can cause the secondary material to release a gaseous product within the molten primary feedstock material. As can be seen in FIG. 8C, at least a portion of the secondary material 806 can be heated by the melt pool 810 to or above an activation temperature of the secondary material such that the secondary material releases gaseous product 812 within the melt pool 810 to form a molten material with gas pockets (i.e., the gaseous product 812) within the melt pool 810.

In some embodiments, a secondary material can remain solid above a melting temperature of the primary feedstock material such that the secondary material remains a solid upon contact with a melt pool. In some such embodiments, the secondary material can release a gaseous product at an activation temperature above a melting temperature of the primary material. By way of non-limiting example, a secondary material that remains solid upon melting of the primary material can include at least one of carbon nanotubes, metal nanoparticles, or ceramic nanoparticles.

Figure 8D:
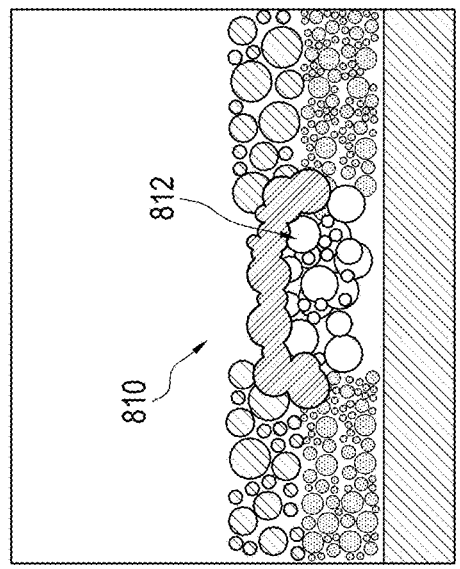

FIG. 8D shows a solidified printed structure 814 that results from a solidification of the melt pool 810 as the molten material cools following removal of the energy source 808. As the melt pool 810 solidifies into the printed structure 814, voids 816 can be generated by the trapped, released gaseous product 812. Accordingly, the solidified printed structure 814 can be a porous printed structure with structural voids 816. In embodiments in which the secondary material remains solid while the primary feedstock material melts to form a melt pool, a final printed structure can include a composite of at least two solid phase materials.

It will be appreciated that the solidified printed structure 814 can represent a single layer of a three-dimensional component. In some embodiments this exemplary method can be repeated for one or more layers of a multi-layer three-dimensional component such that porosity of the three-dimensional component can be selectively controlled. For example, one or more additional layers of a powder material can be introduced to a build surface, a layer of feedstock material on the build surface, a secondary material, and/or the one or more additional layers of powder material. The powder material of the one or more additional layers of powder material can be at least one of a primary material, a secondary material, or an additional powder material. An additional material can then be deposited onto the one or more additional layers of the powder material. One or more energy sources and/or one or more additional energy sources can then be scanned over at least a portion of the one or more additional layers of powder material such that at least a portion of the one or more additional layers of powder material melt to form the melt pool and/or one or more additional melt pools in a manner as described above. It will be appreciated that some layers of a multi-layer three-dimension material may exclude a secondary material, may include a secondary material in differing proportions, and/or may include an additional secondary material. In this manner, structural porosity and/or composition can be varied and controlled on a layer-by-layer basis of a multi-layer three-dimensional component.

Intermixed Primary Feedstock and Secondary Material

FIGS. 9A-9D illustrate another exemplary method of additive manufacturing a component. In the exemplary method depicted in FIGS. 9A-9D, a secondary material is intermixed with a primary feedstock material to form a mixed build material such that porosity and/or composition in a build layer of a three-dimensional component can be controlled.

The method begins by mixing, or otherwise obtaining, a build material, such as a powdered primary feedstock material, with one or more compounds that release a gaseous product when heated to an elevated temperature, such as a secondary material, to form a mixed build material. The mixed build material can then be introduced onto a build surface, for example, using a recoater as described above. FIG. 9A shows a layer of mixed build material 902 on a build surface 904. The mixed build material can include a powdered primary feedstock material 906 and a secondary material 908. As described above, the secondary material 908 can be a gas generation agent that releases a gaseous product upon reaching an activation temperature. In some embodiments, the secondary material can be a gas generation agent that dissociates or sublimes upon heating to a temperature that causes the primary material to melt. In other embodiments, the secondary material can remain a solid at a temperature that causes the primary material to melt. The mixed build material 902 can be a discrete combination of particles of the primary material 906 and the secondary material 908, as illustrated in FIG. 9A. As can be seen, particles of the secondary material 908 can be interspersed with particles of the primary feedstock material 906. The mixed build material 902 can be formed, for example, by mall milling and/or mechanical mixing of powdered forms of the primary feedstock material and the secondary material. In some embodiments, each powder granule of a mixed build material can contain a mixture of a primary material and a secondary material. The build surface 904 can include a build platform, a powder bed, and/or a previously irradiated layer of build material.

Figure 9B:
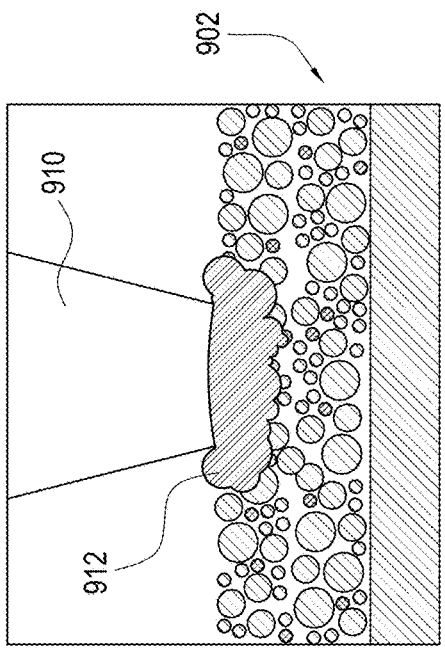
FIGS. 9A-9D schematically illustrate steps of an exemplary method of manufacturing a three-dimensional component with controlled characteristics using a secondary material intermixed with a primary feedstock material to form a mixed build material.

As shown in FIG. 9B, an energy source 910 can strike the mixed build material 902 such that at least a portion of the mixed build material melts and forms a melt pool 912. The energy source 910 can be scanned over at least a portion of the layer of the mixed build material to at least partially melt the mixed build material. As the mixed build material 902 is irradiated by the energy source 910, some of the intermixed particles of secondary material 908 can be thermally activated by heating directly from the energy source. Other particles of the secondary material 908 may be thermally activated indirectly by thermal energy from the melt pool 912, or by thermal energy conducted through a build plate or previously irradiated layers of material. In some embodiments, a pressure surrounding the build platform can be controlled by an atmospheric control system, as disclosed above, while scanning the energy source over at least a portion of the layer of the mixed build material. For example, the pressure surrounding the build platform can include regulating the pressure to a pressure greater than standard atmospheric pressure.

As with previously disclosed secondary materials, an activation temperature of the secondary material may be below, at, or above a melting point of the primary feedstock material. Accordingly, unique structure generation can be achieved by controlling at least one of a secondary material selection, a secondary material amount relative to a first material amount, an energy input into a layer of intermixed build, a pressure surrounding the build platform, or a temperature surrounding the build platform. For example, selection of a secondary material with a lower activation temperature can lead to void formation on contact with a melt pool that includes the secondary material, while selection of a secondary material with a higher activation temperature can allow for intermixing of the secondary material within the melt pool before the secondary material is activated and releases a gaseous product. Release of a gaseous product from the secondary material can also be controlled by spatially controlling the scanning of an energy source over the layer of the mixed build material. Because the secondary material typically requires an input of thermal energy to release a gaseous product, spatial control of the energy source that inputs thermal energy into an AM system allows for control of gaseous product generation. In some embodiments granules of the intermixed material can be coated with additional agents to assist or retard a decomposition process of the secondary material.

Regardless of activation temperature, the secondary material can release a gaseous product upon activation. In some embodiments the secondary material can decompose or sublime when activated. In other embodiments the secondary material can remain a solid. FIG. 9C illustrates the activation of the secondary material 908 within the melt pool 912. As can be seen, the melt pool 912 encapsulates undecomposed particles 914 of the secondary material as well as gaseous product 916 released by activated particles of the secondary material. The gaseous product 916 (i.e., gas pockets or bubbles) evolve, coalesce, and grow while the melt pool remains molten. As such, the gaseous product released from the secondary material can form gas pockets within the molten material of the melt pool 912 that can be trapped within the melt pool, depending, at least in part, on a cooling rate of the melt pool.

Figure 9D:
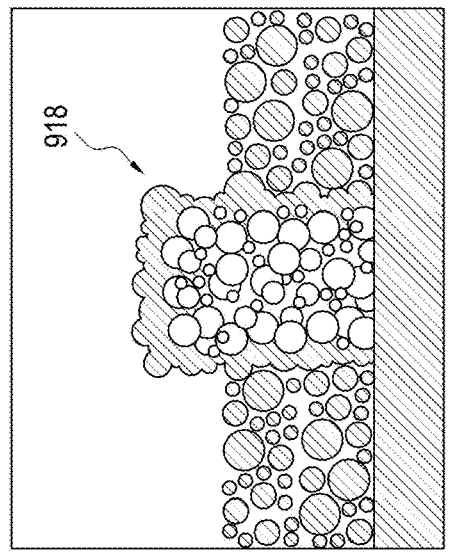
Figure 9A:
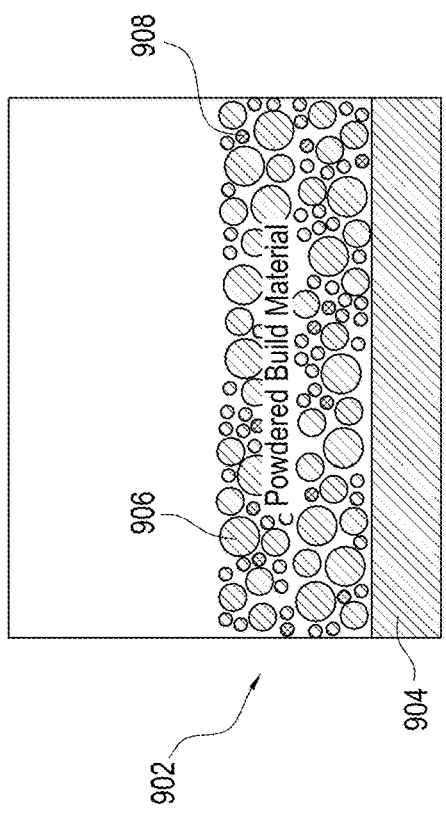
Figure 9C:
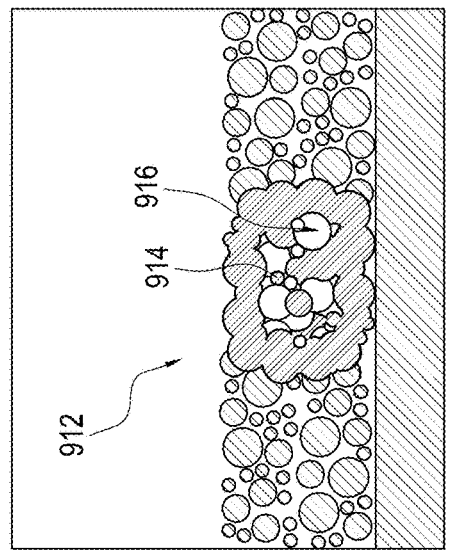

FIG. 9D shows a porous printed structure 918 formed from the solidification of the melt pool 912. The energy source can be removed from the build surface such that the molten material of the melt pool 912 cools and solidifies, forming the printed structure 918. The melt pool 912 can solidify before the gaseous product 916 released by the secondary material is lost to a free-surface of the melt track. Accordingly, the printed structure 918 can contain pores and/or structural voids generated by the trapped gaseous product within the solidified melt pool.

The exemplary method described with reference to FIGS. 9A-9D can be repeated for one or more layers of a multi-layer three-dimensional component to selectively control porosity and/or composition of the three-dimensional component on a layer-by-layer basis. For example, one or more additional layers of powder material can be introduced to the build surface, the later of the mixed build material, and/or the one or more additional layers of a powder material. The powder material of the one or more additional layers of a powder material can be one or more of the mixed build material and/or one or more additional powder materials. At least one of the one or more energy sources or one or more additional energy sources can be scanned over at least a portion of the one or more additional layers of a powder material such that at least a portion of the one or more additional layers of a powder material melt to form a melt pool(s) and causes at least a portion of a secondary material to reach an activation temperature. The respective one or more energy sources or additional energy sources can then be removed such that the melt pool cools and solidifies to produce a multi-layer three-dimensional object. In some embodiments, repeating the exemplary method of FIGS. 9A-9D can include introducing a second layer of a mixed build material to at least one of the build surface or the layer of the mixed build material, scanning at least one of the energy source or an additional energy source over the second layer of the mixed build material while controlling a pressure of an environment surrounding the build surface to a pressure level that is different than a pressure level of a prior layer such that the second layer and a prior layer have different layer porosities.

Pressure Control and Use of a Secondary Material

In at least some embodiments of methods of manufacturing a three-dimensional component using a secondary material as provided for herein, a pressure surrounding the build platform (i.e., a build pressure) can be controlled as a useful processing parameter to control the kinetics of gas generation and transport and/or melt pool formation and solidification to permit tailoring of pore size, number density, and/or bulk porosity in a printed layer of a three-dimensional component. For example, a moderate increase of pressure surrounding the build platform, e.g. approximately in the range of about 30 psig to about 75 psig, may retard the evolution and/or transport of released gaseous product from the secondary material in a melt pool. Even modest increases in pressure may have a desirable impact with respect to the kinetics of gas generation and entrapment.

An AM device, such as the device described above with respect to FIG. 7, and of the methods of additive manufacturing incorporating a secondary material can optionally include features of an atmospheric control system and/or method as disclosed herein. For example, any of the methods or devices disclosed herein can include an atmospheric control system such that a pressure surrounding a build surface can be controlled and/or maintained at a pressure above standard atmospheric pressure, or at any desired, achievable pressure. Accordingly, in some embodiments the device 700 can further include a controller configured to vary at least one of a relative material composition and a build pressure, which in turn can change at least a porosity of a manufactured object across one or more layers of a three-dimensional component being manufactured.

An exemplary method of an AM-produced three-dimensional component with atmospheric pressure control and use of a secondary material to control porosity can include introducing a layer of a primary feedstock material to a build surface and depositing onto the layer of primary feedstock material one or more secondary materials that release a gaseous product when heated to an elevated temperature. The method can further include scanning an energy source over the layer of the primary feedstock material so as to at least partially melt the feedstock material to form a melt pool and cause the one or more secondary material to release a gaseous product within the melt pool while controlling the pressure of a build environment. The energy source can be removed, and a build platform recessed such that the above steps can be repeated to produce a three-dimensional object. Other types of movements of the build platform, for instance in other lateral and/or vertical directions, are possible without departing from the spirit of the present disclosure.

Figure 10A:
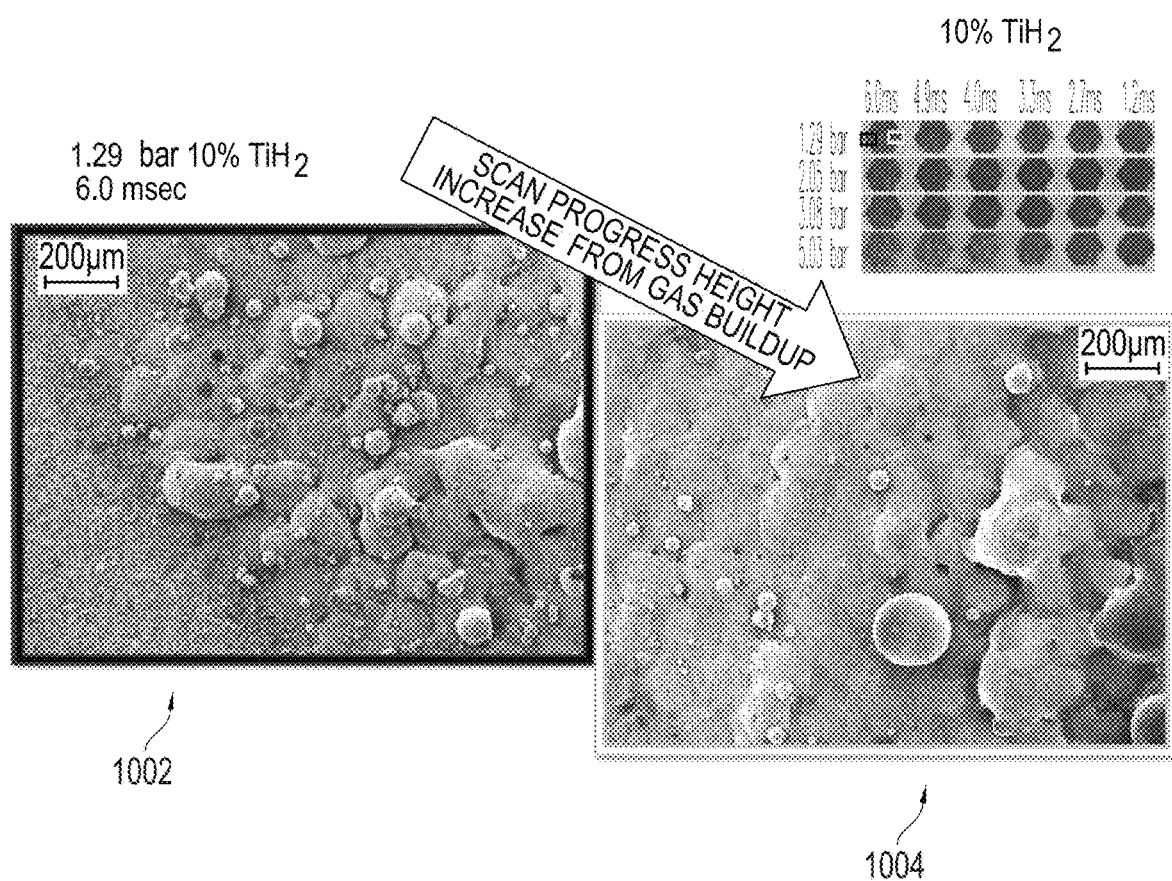
FIG. 10A is a Scanning Electron Micrograph (SEM) of a single layer of a three-dimensional component produced using an exemplary method of the present disclosure at a pressure of about 1.29 bar.
Figure 10B:
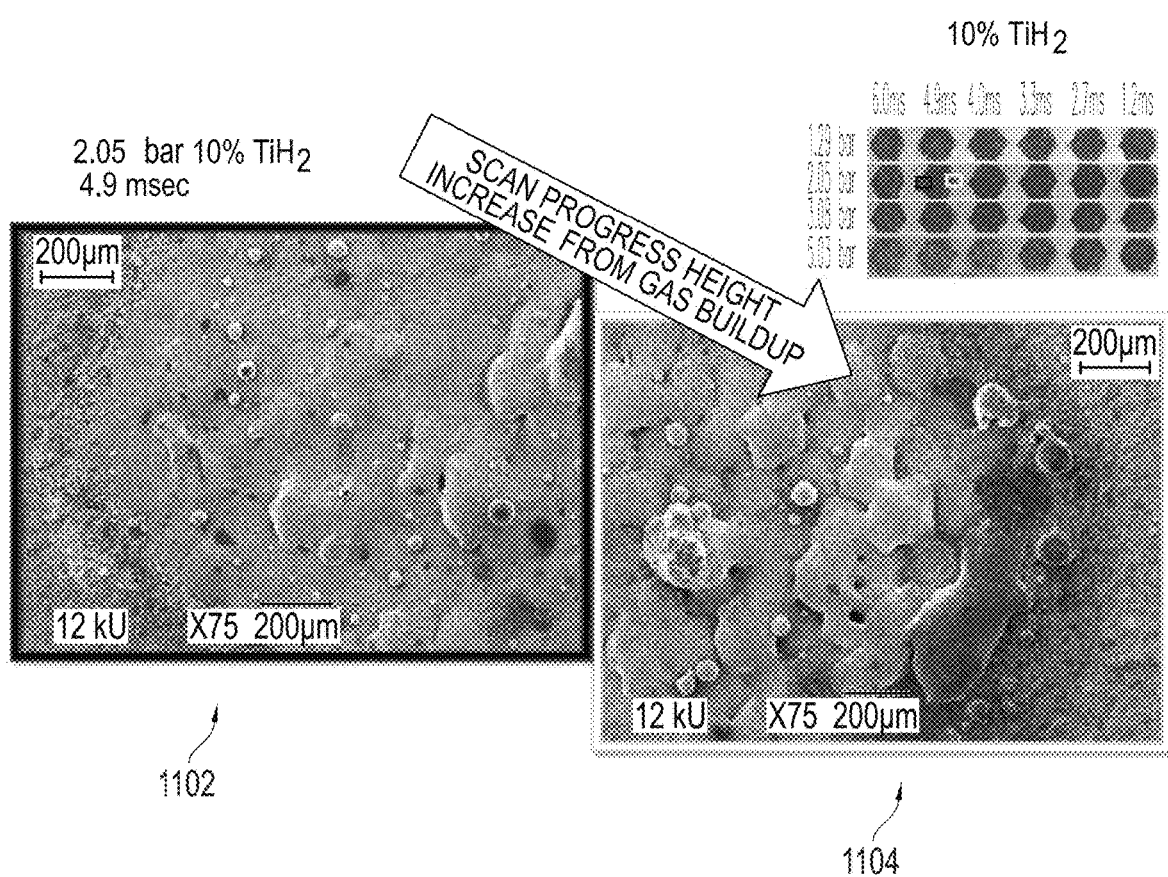
FIG. 10B is an SEM of a single layer of a three-dimensional component produced using an exemplary method of the present disclosure at a pressure of about 2.05 bar.
Figure 10C:
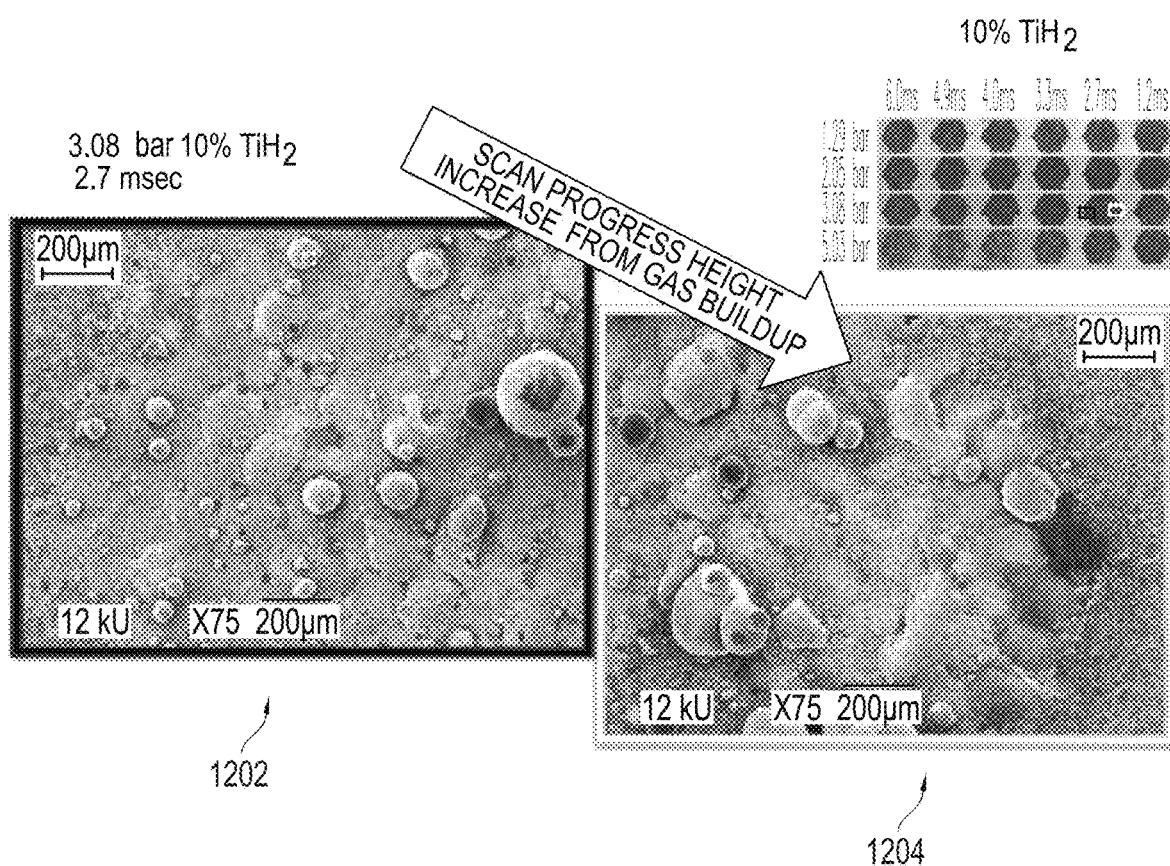
FIG. 10C is an SEM of a single layer of a three-dimensional component produced using an exemplary method of the present disclosure at a pressure of about 3.08 bar.

FIGS. 10A-10C each show a two-dimensional Scanning Electron Micrograph (SEM) of a metal foam produced using an additive manufacturing process with a mixed build material under varying build pressures. These SEM images illustrate results of an exemplary additive manufacturing method of the present disclosure. To produce the SEM images of FIGS. 10A-10C, hexagonal-close-packed point continuous wave (CW) exposures of a laser were used to process a build material layer of 316 L stainless steel powder (i.e., a primary feedstock material) mixed with about 10% TiH powder by weight, the build material layer having a height of approximately 76.2 μm. The TiH powder serves as a secondary material (i.e., a gas generation agent) intermixed with the primary feedstock material.

Table 1 sets forth the approximate experimental conditions used in a process that resulted in each of the three scans.

| Processing Parameter | Result 1 FIG. 10A | Result 2 FIG. 10B | Result 3 FIG. 10C |
| --- | --- | --- | --- |
| Laser Power (W) | | 70 | |
| Laser Wavelength (nm) | | 1064 | |
| Power at the Build Plate (W) | | 61.9 | |
| Pitch of Points (μm) | | 176 | |
| Laser Focus (mm below Build Plate) | | 6.4 | |
| TiH$_2$ Powder Loading | | 10% by weight | |
| Powder Layer Height (μm) | | 76.2 | |
| Inert Gas | | Argon | |
| Environmental Pressure (bar - absolute) | 1.29 | 2.05 | 3.08 |
| Laser Exposure Time (ms) | 6.0 | 4.9 | 2.7 |
| $\aleph_{0HCP}^*$ (Non-Dimensional Energy Density Based on 316L Material Parameters) | 9.04 | 7.38 | 4.07 |

A build layer imaged in FIG. 10A was formed by scanning a laser with an energy density of about 9.04 over a layer of the intermixed build mixture for about 6.0 ms at a build pressure of about 1.29 bar. FIG. 10A includes a first SEM image 1002 taken early in a print layer and a second SEM image 1004 taken later in the print later than the first image 1002. A build layer imaged in FIG. 10B was formed by scanning a laser with an energy density of about 7.38 over a layer of the intermixed build mixture for about 4.9 ms at a build pressure of about 2.05 bar. FIG. 10B includes a first SEM image 1102 taken early in a print layer and a second SEM image 1104 taken later in the print later than the first image 1102. A build layer imaged in FIG. 10C was formed by scanning a laser with an energy density of about 4.07 over a layer of the intermixed build mixture for about 2.7 ms at a build pressure of about 3.08 bar. FIG. 10C includes a first SEM image 1202 taken early in a print layer and a second SEM image 1204 taken later in the print later than the image 1202.

As a build pressure was raised, lower exposure energy from the energy source is needed to activate the secondary material and trap the gaseous product released as the secondary material decomposes. FIGS. 10A-10C show that similar blistering morphology generated gaseous products was observed in each exposure. In each of the SEM images, open cell porosity can be observed, and the relative height of the build layer visually increases from early in the print to late in the print from an increase in gaseous product build-up. This can be seen by comparing the first scan in each of FIGS. 10A-10C (i.e., images 1002, 1102, and 1202) to the second scan in the corresponding figure (i.e., images 1004, 1104, and 1204, respectively).

Commercial Applications

Enhanced process control as provided for herein with existing additively manufactured materials can lead to higher/better performing parts. The enhanced part quality demonstrated through the application of elevated build pressure translates to increased part density and reduced generation of defects resulting in improved mechanical performance, tighter geometric tolerances, and better part finish. This increase in performance is derived directly from the larger temperature range over which a melt pool can be sustained because it allows for greater process control and a larger margin of error. These effects result in a minimization of melt pool surface vaporization, thus stabilizing melt pool dynamics, and reducing defect generation. There is an important tradeoff between build rate and defect generation that comes into play: faster build rates require higher energy transfer, which results in greater surface vaporization at a given pressure. An advantage of the systems and methods disclosed herein is that an increase in melt pool stability can be turned into faster production. For an increase in pressure, and a corresponding reduction in surface material vaporization, an energy input into the system can be increased, relative to a process being performed without atmospheric control, before the process achieves the same material vaporization rate as a process without an increase in build pressure (i.e., an AM process occurring at or below standard atmospheric pressure). However, because an AM process performed with a build pressure above standard atmospheric pressure can have a greater amount of energy being driven into the system for a certain defect generation rate, the build rate can be increased as compared to an AM process at or below standard atmospheric pressure for the same defect generation rate. In other words, the increase in pressure can be used to reduce defect rates through greater melt pool stability, increase production rates through greater energy transfer, or a combination of the two. Accordingly, the systems, methods, and devices disclosed herein can produce better parts at a faster rate, increasing product quality and machine throughput.

Leveraging atmospheric control in commercial systems provides an opportunity for AM printing to be used more extensively when coupled with new materials. Returning to the example of magnesium, the systems, methods, and devices disclosed herein enable for magnesium to be used in an AM process. Due to the lightweight nature and strength of magnesium, magnesium has extensive applications in many industries including automotive, aerospace, tooling, and electronic devices. The medical industry can benefit from the use of magnesium as a structural element in many products because it is a biocompatible material. Accordingly, the application of AM methods to magnesium provides the opportunity to apply all the advantages of AM, such as complex features, and manufacture items not buildable using traditional methods. Many different medical devices and implants can result from the present disclosures, including but not limited to implantable devices, such as rods, pins, anchors, discs, and surgical devices themselves, such as insertion devices, tissue cutters and ablators, etc.

The ability to control density locally in an AM process allows for the co-optimization of part geometry and density. A porous structure produced using ACAM systems as provided for herein and/or porous materials produced without atmospheric control of a build environment as also provided for herein can be closed-cell in nature, making them useful for structural and load-bearing applications. Given the high stiffness to strength ratio in metal foams, they are commonly used in weigh-constrained environments such as high performance automotive and aerospace applications. Additionally, the low density combined with high stiffness means that metal and plastic foams make for excellent energy absorbers. Combined with three-dimensional printing, these elements can be custom made in complex shapes and formed continuously with higher density structural members. In addition to the application of biocompatible and biodegradable magnesium in medical implants, there is extensive interest in the medical community for foamed metal structures for use in implants. Control and grading of porosity as described herein may further permit tuning of part stiffness to match surrounding tissues, thereby avoiding injuries due to implant "stress-shielding."

One skilled in the art will appreciate further features and advantages of the disclosure based on the above-described embodiments. Accordingly, the disclosure is not to be limited by what has been particularly shown and described, except as indicated by the appended claims.

What is claimed is:

1. A method of additive manufacturing, comprising:
   introducing a layer of powdered build material to a build surface in a build chamber of an additive manufacturing device;
   controlling a pressure of a build environment above atmospheric pressure within the build chamber;
   scanning an energy source over at least a portion of the layer of powdered build material such that at least a portion of the powdered build material is fused at least partially to form a build material while controlling a pressure of an environment in the build chamber so as to suppress evaporation of the build material during fusing; and
   varying at least one of a relative material composition or the pressure of the environment in the build chamber to change at least a porosity of a manufactured object that includes the layer of powdered build material across one or more of the layer of powdered build material or one or more additional layers of powdered build material of the manufactured object,
   wherein the powdered build material comprises a material that does not have a liquid phase at atmospheric pressure, and wherein scanning the energy source over at least a portion of the layer of powdered build material melts the portion of the powdered build material.

2. The method of claim 1, further comprising:
   introducing one or more additional layers of powdered material to at least one of the build surface, the layer of powdered build material, or the one or more additional layers of powdered build material; and
   scanning one of the energy source or one or more additional energy sources over the one or more additional layers of powdered material such that the material is fused at least partially to form the build material while controlling the pressure of the environment in the build chamber so as to suppress evaporation of the build material during fusing, thereby producing a three-dimensional object.

3. The method of claim 1, wherein the powdered build material comprises an alloy that includes at least one of magnesium, aluminum, iron, or titanium.

4. The method of claim 1, wherein the powdered build material comprises magnesium.

5. The method of claim 1, wherein controlling the pressure of the surrounding environment further comprises controlling the pressure of the surrounding environment in a closed-system configuration to maintain a desired pressure profile.

6. The method of claim 1, wherein controlling the pressure of the surrounding environment further comprises recirculating a containment through the build chamber.

7. The method of claim 1, further comprising:
   introducing a gas at a pressure higher than atmospheric pressure to the build environment,
   wherein at least one of scanning an energy source or scanning one of the energy source or one or more additional energy sources comprises scanning the respective energy source or energy sources over the powdered build material while controlling the pressure of the build environment such that at least a portion of the powdered build material becomes molten build material and at least a portion of the gas diffuses into the molten build material; and
   removing at least one of the energy source or the one or more additional energy sources from the molten build material such that the build material solidifies, while retaining at least some of the gas that diffused into the molten build material.

8. The method of claim 7, further comprising performing a secondary processing step at a pressure lower than the pressure at which the gas was introduced to allow the trapped gas to evolve out of the build material, resulting in void generation in the build material.

9. The method of claim 1, further comprising:
   depositing a secondary material onto at least a portion of the layer of the powdered build material,
   wherein scanning the energy source over at least a portion of the layer of powdered build material melts the powdered build material to form a melt pool, and
   wherein the secondary material releases a gaseous product when a temperature of the secondary material is raised to an activation temperature during scanning of the energy source.

10. The method of claim 9, wherein the activation temperature is a temperature at or below a melting temperature of the powdered build material.

11. The method of claim 9, wherein the activation temperature is a temperature above a melting temperature of the powdered build material.

12. The method of claim 9, wherein depositing a secondary material further comprises depositing the secondary material by inkjet printing or extrusion.

13. The method of claim 9, wherein the secondary material comprises at least one of a metallic hyrdide, carbon nanotubes, metal nanoparticles, or ceramic nanoparticles.

14. The method of claim 1, further comprising:
introducing one or more additional layers of powdered material to at least one of the build surface, the layer of powdered build material, or the one or more additional layers of powdered build material; and
introducing a shielding agent into the build environment under high-pressure to drive void generation in one or more of the layer of powdered build material or the one or more additional layers of powdered material.

15. The method of claim 1, further comprising depositing a secondary material onto or below the layer of powdered build material, prior to at least partially fusing the build material, to form a three-dimensional object that has at least one of a spatially graded composition or a spatially graded porosity.

16. The method of claim 15, wherein depositing the secondary material occurs by inkjet printing.

17. A method of additive manufacturing, comprising:
forming a three-dimensional object having at least one of a spatially graded composition or a spatially graded porosity, wherein forming the three-dimensional object further comprises:
introducing a layer of powdered build material to a build surface in a build chamber of an additive manufacturing device;
depositing a secondary material onto or below the layer of powdered build material; and
scanning an energy source over at least a portion of the layer of powdered build material such that at least a portion of the powdered build material is fused at least partially,
wherein the secondary material remains in a solid form while at least a portion of the powdered build material becomes molten such that upon solidification of the molten powdered build material, a composite of a portion of the solid powdered build material and a portion of the solid secondary material is formed.

18. The method of claim 17, wherein depositing the secondary material occurs by inkjet printing.

19. The method of claim 17,
wherein scanning the energy source over at least a portion of the layer of powdered build material melts the powdered build material to form a melt pool, and
wherein the secondary material releases a gaseous product when a temperature of the secondary material is raised to an activation temperature.

20. The method of claim 19, wherein the activation temperature is a temperature above a melting temperature of the powdered build material.

21. The method of claim 17, further comprising repeating one or more of the following actions to form the three-dimensional object:
introducing the layer of powdered build material;
depositing the secondary material onto or below the layer of powdered build material; or
scanning an energy source over at least a portion of the layer of powdered build material over a plurality of layers.

* * * * *